US012057883B2

(12) United States Patent
Lv et al.

(10) Patent No.: US 12,057,883 B2
(45) Date of Patent: Aug. 6, 2024

(54) RADIO OVER FIBER SYSTEM AND NONLINEAR COMPENSATION METHOD

(71) Applicant: Huawei Technologies Co., Ltd., Shenzhen (CN)

(72) Inventors: Yibo Lv, Dongguan (CN); Xu Li, Shenzhen (CN); Tianxiang Wang, Shenzhen (CN); Weiwei Zhang, Shenzhen (CN); Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/942,278

(22) Filed: Sep. 12, 2022

(65) Prior Publication Data

US 2023/0006741 A1 Jan. 5, 2023

Related U.S. Application Data

(63) Continuation of application No. PCT/CN2021/076209, filed on Feb. 9, 2021.

(30) Foreign Application Priority Data

Mar. 11, 2020 (CN) .......................... 202010167908.7

(51) Int. Cl.
*H04B 10/50* (2013.01)
*H04B 10/2543* (2013.01)
(Continued)

(52) U.S. Cl.
CPC ... *H04B 10/25752* (2013.01); *H04B 10/2543* (2013.01); *H04J 14/0227* (2013.01);
(Continued)

(58) Field of Classification Search
CPC .......... H04B 10/25752; H04B 10/2543; H04B 10/2507; H04B 10/25753; H04B 10/075;
(Continued)

(56) References Cited

U.S. PATENT DOCUMENTS 6,574,209 B1 * 6/2003 Kosaka ................ H03G 3/3036
455/67.11
6,600,792 B2 * 7/2003 Antonio ................ H03F 1/3247
330/149
(Continued)

FOREIGN PATENT DOCUMENTS

CN 1753334 A 3/2006
CN 101520666 A 9/2009
(Continued)

OTHER PUBLICATIONS

Hekkala et al, Predistortion of Radio Over Fiber Links Algorithms, Implementation, and Measurements, Mar. 2012, IEEE, All Document. (Year: 2012).*

(Continued)

*Primary Examiner* — Dibson J Sanchez
(74) *Attorney, Agent, or Firm* — Conley Rose, P.C.

(57) ABSTRACT

A radio over fiber (RoF) system and a nonlinear compensation method, where the RoF system includes a BBU and an RRU, the RRU includes an electrical component, and the BBU includes a downlink and a feedback link. A predistortion module and an optical component are disposed on the downlink, an input end of the feedback link is connected to an output end of the optical component, and the feedback link is configured to feed back, to the predistortion module, a nonlinear signal output by the optical component. The RoF system further includes a temperature detection module configured to detect a temperature value of the electrical component, and transmit the temperature value to the predistortion module. The predistortion module is configured to (Continued)

perform digital predistortion DPD on a baseband signal based on the temperature value and the nonlinear signal.

20 Claims, 17 Drawing Sheets

(51) Int. Cl.
    *H04B 10/2575*     (2013.01)
    *H04J 14/02*     (2006.01)
    *H04B 10/07*     (2013.01)
    *H04B 10/2507*     (2013.01)

(52) U.S. Cl.
    CPC .......... *H04B 10/07* (2013.01); *H04B 10/2507* (2013.01); *H04B 10/2575* (2013.01); *H04B 10/50* (2013.01); *H04B 10/5057* (2013.01)

(58) Field of Classification Search
    CPC .......... H04B 10/2563; H04B 10/2575; H04B 10/07; H04B 10/50; H04B 10/5057; H04J 14/0227; H04L 25/49
    USPC .................. 398/9–38, 115–117, 182–201
    See application file for complete search history.

(56) References Cited

U.S. PATENT DOCUMENTS

| | | | |
|---|---|---|---|
| 6,731,168 B2* | 5/2004 | Hedberg | H03F 1/3294 330/289 |
| 8,260,143 B2 | 9/2012 | Gupta et al. | |
| 8,982,995 B1* | 3/2015 | Van Cai | H04B 1/0475 375/297 |
| 9,647,764 B2 | 5/2017 | Mysore | |
| 2004/0017257 A1 | 1/2004 | Kim | |
| 2009/0072900 A1* | 3/2009 | Park | H03F 1/3282 370/294 |
| 2010/0253426 A1* | 10/2010 | Su | H03F 1/02 330/149 |
| 2012/0154038 A1* | 6/2012 | Kim | H04L 27/368 330/149 |
| 2016/0112134 A1* | 4/2016 | Masunaga | H04B 10/25753 398/115 |
| 2016/0218801 A1* | 7/2016 | Chung | H04B 10/50572 |
| 2017/0093495 A1* | 3/2017 | Lozhkin | H04B 10/25753 |
| 2018/0109318 A1* | 4/2018 | Castro | H04B 10/2513 |
| 2019/0334621 A1* | 10/2019 | Goodwill | H04B 10/25752 |
| 2022/0416893 A1* | 12/2022 | Zhong | H04B 10/25754 |

FOREIGN PATENT DOCUMENTS

| | | |
|---|---|---|
| CN | 201854275 U | 6/2011 |
| CN | 102378336 A | 3/2012 |
| CN | 102457458 A | 5/2012 |
| CN | 103297214 A | 9/2013 |
| CN | 102457458 B | 8/2015 |
| CN | 107302471 A | 10/2017 |
| CN | 109428610 A | 3/2019 |
| EP | 2299774 A1 | 3/2011 |

OTHER PUBLICATIONS

W. Tang, et al., "A Simple Envelope-Assisted RF/IF Digital Predistortion Model for Broadband RoF Fronthaul Transmission," in Journal of Lightwave Technology, vol. 36, No. 19, Oct. 1, 2018, 7 pages.

P. O. Fisher et al., "An Optimized Segmented Quasi-Memoryless Nonlinear Behavioral Modeling Approach for RF Power Amplifiers," in IEEE Transactions on Microwave Theory and Techniques, vol. 66, No. 1, Jan. 2018, 12 pages.

M. Noweir, et al., "Carrier Aggregated Radio-Over-Fiber Downlink for Achieving 2Gbps for 5G Applications," in IEEE Access, vol. 7, Jan. 11, 2019, 7 pages.

P. Li et al., "Multi-IF-Over-Fiber Based Mobile Fronthaul With Blind Linearization and Flexible Dispersion Induced Bandwidth Penalty Mitigation," in Journal of Lightwave Technology, vol. 37, No. 4, Feb. 15, 2019, 10 pages.

Mohamed Kamoun et al, "Radio over fiber for cellular networks: system identification and pre-distortion strategies," 2019 IEEE Wireless Communications and Networking Conference (WCNC), 6 pages.

C. Mateo, et al., "Minimization of Feedback Loop Distortions in Digital Predistortion of a Radio-Over-Fiber System With Optimization Algorithms," in IEEE Photonics Journal, vol. 9, No. 3, Jun. 2017, Art No. 7904414, 15 pages.

\* cited by examiner

| A feedback link feeds back a nonlinear signal output by an optical component 12 to a predistortion module 11; and a temperature detection module 22 detects a temperature value of an electrical component 21, and transmits the temperature value to the predistortion module 11 | ⟵ S501 |

| The predistortion module 11 performs DPD on a baseband signal based on the temperature value and the nonlinear signal | ⟵ S502 |

FIG. 5

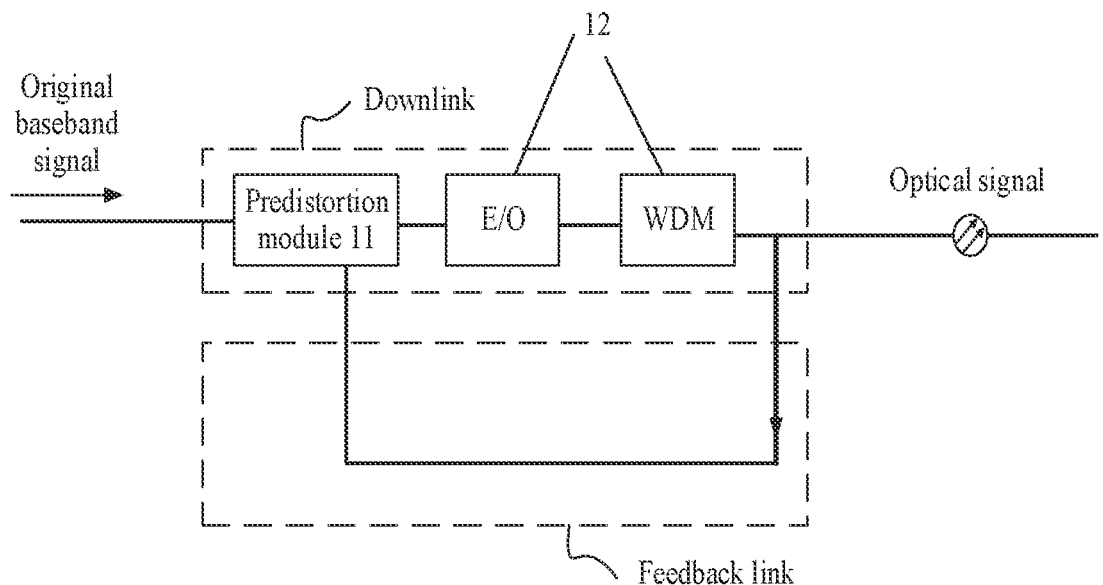

FIG. 6A

RADIO OVER FIBER SYSTEM AND NONLINEAR COMPENSATION METHOD

CROSS-REFERENCE TO RELATED APPLICATIONS

This application is a continuation of International Patent Application No. PCT/CN2021/076209, filed on Feb. 9, 2021, which claims priority to Chinese Patent Application No. 202010167908.7, filed on Mar. 11, 2020. The disclosures of the aforementioned applications are hereby incorporated by reference in their entireties.

TECHNICAL FIELD

This application relates to the field of wireless communications, and in particular, to a radio over fiber system and a nonlinear compensation method.

BACKGROUND

Compared with a digital common public radio interface (CPRI)/enhanced-CPRI (eCPRI) remote technology, a radio over fiber (RoF) technology can improve a data transmission rate and effectively simplify hardware structures of a remote radio unit (RRU) and a baseband processing unit (BBU) in an access network. In addition, an analog RoF system can support technologies such as subcarrier modulation, wavelength-division multiplexing (WDM), and polarization multiplexing, to implement co-existence and co-transmission of signals of multi-frequency bands and multi-communications standards (for example, a baseband digital signal, a Long-Term Evolution (LTE) signal, a mobile telecommunications system (, e.g., a Universal Mobile Telecommunications System (UMTS)) signal, a Wi-Fi signal, a millimeter wave signal, and the like). This feature can further improve performance of a central access network (e.g., a Cloud-Radio Access Network (C-RAN)) in terms of compatibility, quantity of access users, and throughput.

However, in the RoF system, there are a large quantity of nonlinear elements on a downlink, for example, an optical-electro (O/E) conversion component, an electro-optical (E/O) conversion component, and a power amplifier (PA), causing nonlinear distortion of a downlink signal. In a conventional technology, to compensate for the nonlinear distortion on the downlink, a feedback link is generally disposed from an RRU side to a BBU side, and a downlink signal on the RRU side is fed back to the BBU through the feedback link. In addition, a predistortion module is disposed on the RRU side. The predistortion module determines a nonlinear characteristic of the downlink based on an input signal of the downlink and a feedback signal transmitted back through the feedback link, and then performs digital predistortion (DPD) on the downlink to compensate for the nonlinear distortion of the downlink.

In the conventional technology, to reduce hardware complexity, the feedback signal and uplink data generally share a same transmission link. Therefore, a control circuit needs to be added on the RRU side to implement switching between the uplink data and feedback information. In addition, to implement that the feedback signal is transmitted from the remote RRU back to the BBU, new nonlinear elements such as the E/O, the O/E, and the PA need to be introduced into the feedback link. However, the introduction of the control circuit and the new components such as the E/O, the O/E, and the PA may cause additional nonlinear distortion to the RoF system. Consequently, the predistortion module cannot obtain a correct nonlinear characteristic of the downlink. Finally, the predistortion module actually performs modeling and compensation for nonlinearity of all uplinks and downlinks. Therefore, the RoF system in the conventional technology still has a poor linearization effect.

SUMMARY

Embodiments of this application provide an RoF system and a nonlinear compensation method, to improve a linearization effect of the RoF system.

According to a first aspect, an embodiment of this application provides an RoF system. The RoF system includes a BBU and an RRU, the RRU includes an electrical component, and the BBU includes a downlink and a feedback link. A predistortion module and an optical component are disposed on the downlink, an input end of the feedback link is connected to an output end of the optical component, and the feedback link is configured to feed back, to the predistortion module, a nonlinear signal output by the optical component. The RoF system further includes a temperature detection module configured to detect a temperature value of the electrical component, and transmit the temperature value to the predistortion module. The predistortion module is configured to perform digital predistortion DPD on a baseband signal based on the temperature value and the nonlinear signal.

In this embodiment of this application, the feedback link is directly connected to the output end of the optical component, such that a quantity of nonlinear components additionally introduced by the feedback link can be reduced, hardware complexity of the feedback link can be reduced, and nonlinear distortion additionally introduced by the feedback link can further be greatly reduced or even avoided. In addition, the predistortion module performs the DPD on the baseband signal based on the nonlinear signal fed back by the feedback link and the temperature value of the electrical component, such that compensation for both electrical domain nonlinearity and optical domain nonlinearity can be ensured. This can overall improve a linearization effect of the RoF system.

In a possible design, the predistortion module is configured to: perform first DPD on an original baseband signal based on the temperature value, to compensate for nonlinear distortion caused by the electrical component; and perform, based on the nonlinear signal, second DPD on a baseband signal that goes through the first DPD, to compensate for nonlinear distortion caused by the optical component.

In this implementation, on one hand, the feedback link is directly connected to the output end of the optical component such that a quantity of nonlinear components additionally introduced by the feedback link can be reduced, hardware complexity of the feedback link can be reduced, nonlinear distortion additionally introduced by the feedback link can further be greatly reduced or even avoided, and accuracy of performing optical domain nonlinear compensation by the RoF system can be improved; and on the other hand, the predistortion module 11 remotely monitors the temperature value of the electrical component 21, such that accuracy of performing electrical domain nonlinear compensation by the RoF system can be improved, hardware complexity of the RRU and the BBU can further be simplified, and nonlinear distortion can be avoided to be additionally introduced.

In a possible design, the predistortion module stores a correspondence between temperature of the electrical component and a DPD parameter. Additionally, that the predistortion module performs the first DPD on the original baseband signal based on the temperature value is: determining, according to the correspondence, a DPD parameter corresponding to the temperature value; and performing the first DPD on the original baseband signal based on the determined DPD parameter.

In this implementation, efficiency of performing the first DPD on the original baseband signal by the predistortion module can be improved, and a linearization effect of the RoF system can further be improved.

In a possible design, the temperature detection module is configured to: when detecting that the temperature value of the electrical component is updated, transmit an updated temperature value to the predistortion module.

In this implementation, the temperature detection module may be prevented from frequently sending the temperature value to the predistortion module, and system power consumption can be reduced.

In a possible design, the temperature detection module includes a thermistor, and the thermistor is disposed on the RRU and is closely attached to the electrical component.

In this implementation, the temperature detection module is implemented using the thermistor, such that the temperature detection module is basically implemented on the RRU side. This can reduce calculation requirements on the BBU side.

In a possible design, the temperature detection module includes a sensing optical fiber and a Raman optical time domain reflectometer. The sensing optical fiber is disposed on the RRU and is closely attached to the electrical component, and the Raman optical time domain reflectometer is disposed on the BBU and is connected to the predistortion module. The sensing optical fiber is configured to sense the temperature of the electrical component to generate a Raman scattering optical signal, and feed back the Raman scattering optical signal to the Raman optical time domain reflectometer. The Raman optical time domain reflectometer is configured to determine the temperature of the electrical component based on the Raman scattering optical signal.

In this implementation, the temperature detection module is basically implemented on the BBU side. This can reduce calculation requirements on the RRU side, and can simplify system hardware complexity.

In a possible design, that the predistortion module performs, based on the nonlinear signal, the second DPD on the baseband signal that goes through the first DPD is: calculating, using a preset algorithm, the baseband signal that goes through the first DPD and the nonlinear signal, to obtain a DPD parameter; and performing, using the DPD parameter, the second DPD on the baseband signal that goes through the first DPD; where the preset algorithm is any one of algorithms such as a neural network model, a Volterra Volterra polynomial, a memory polynomial (MP), a normalized memory polynomial (GMP), a Wiener-Hammerstein Wiener-Hammerstein polynomial, a cubic spline cubic spline, or a canonical piecewise-linear CPWL equation.

In this implementation, accuracy of performing optical domain nonlinear compensation by the RoF system can further be improved.

In a possible design, the optical component includes an electro-optic modulator, and the electrical component includes a power amplifier.

In this implementation, compensation can be performed for nonlinear distortion caused by the electro-optic modulator and the power amplifier.

In a possible design, the optical component further includes a wavelength division multiplexer, and an input end of the wavelength division multiplexer is connected to an output end of the electro-optic modulator. The input end of the feedback link is connected to an output end of the wavelength division multiplexer, such that overall compensation can be performed for optical domain nonlinear distortion caused by the electro-optic modulator and the wavelength division multiplexer, and a linearization effect of the system can further be improved. Alternatively, the input end of the feedback link is connected between the wavelength division multiplexer and the electro-optic modulator, such that compensation can be performed for optical domain nonlinear distortion caused by the electro-optic modulator, optical domain nonlinear distortion caused by the wavelength division multiplexer is not considered, and calculation complexity of the predistortion module can be reduced.

In a possible design, one optical fiber is disposed between the BBU and the RRU, and the temperature value and an uplink signal and a downlink signal of the RoF system are transmitted through the optical fiber.

In this implementation, fiber deployment costs can be reduced.

In a possible design, a first optical fiber and a second optical fiber are disposed between the BBU and the RRU. The downlink signal of the RoF system and the temperature value are transmitted through the first optical fiber, and the uplink signal of the RoF system is transmitted through the second optical fiber; or the downlink signal of the RoF system is transmitted through the first optical fiber, and the uplink signal of the RoF system or the temperature value is transmitted through the second optical fiber; or the uplink signal and the downlink signal of the RoF system are transmitted through the first optical fiber, and the temperature value is transmitted through the second optical fiber.

In this implementation, deployment flexibility of the RoF system can be improved.

In a possible design, that the input end of the feedback link is connected to the output end of the optical component includes: the input end of the feedback link is directly connected to the output end of the optical component; or the input end of the feedback link is indirectly connected to the output end of the optical component using a linear element.

In this implementation, deployment flexibility of the RoF system can be improved, and applicability of the scheme can be improved.

According to a second aspect, an embodiment of this application provides a nonlinear compensation method, applied to an RoF system. The RoF system includes a BBU and an RRU, the RRU includes an electrical component, and the BBU includes a downlink and a feedback link. A predistortion module and an optical component are disposed on the downlink. An input end of the feedback link is connected to an output end of the optical component. The RoF system further includes a temperature detection module. The method includes. The feedback link feeds back a nonlinear signal output by the optical component to the predistortion module; the temperature detection module detects a temperature value of the electrical component, and transmits the temperature value to the predistortion module; and the predistortion module performs digital predistortion DPD on a baseband signal based on the temperature value and the nonlinear signal.

In a possible design, that the predistortion module performs digital predistortion DPD on a baseband signal based on the temperature value and the nonlinear signal includes: The predistortion module performs first digital predistortion DPD on an original baseband signal based on the temperature value, to compensate for nonlinear distortion caused by the electrical component; and the predistortion module performs, based on the nonlinear signal, second DPD on a baseband signal that goes through the first DPD, to compensate for nonlinear distortion caused by the optical component.

In a possible design, the predistortion module stores a correspondence between temperature of the electrical component and a DPD parameter. That the predistortion module performs first digital predistortion DPD on an original baseband signal based on the temperature value includes: The predistortion module determines, according to the correspondence, a DPD parameter corresponding to the temperature value; and the predistortion module performs the first DPD on the original baseband signal based on the determined DPD parameter.

In a possible design, that the temperature detection module detects a temperature value of the electrical component, and transmits the temperature value to the predistortion module includes: When detecting that the temperature value of the electrical component is updated, the temperature detection module transmits an updated temperature value to the predistortion module.

In a possible design, the temperature detection module includes a thermistor, and the thermistor is disposed on the RRU and is closely attached to the electrical component.

In a possible design, the temperature detection module includes a sensing optical fiber and a Raman optical time domain reflectometer. The sensing optical fiber is disposed on the RRU and is closely attached to the electrical component. The Raman optical time domain reflectometer is disposed on the BBU and is connected to the predistortion module. That the temperature detection module detects a temperature value of the electrical component includes: The sensing optical fiber senses the temperature of the electrical component to generate a Raman scattering optical signal, and feeds back the Raman scattering optical signal to the Raman optical time domain reflectometer; and the Raman optical time domain reflectometer determines the temperature of the electrical component based on the Raman scattering optical signal.

In a possible design, that the predistortion module performs, based on the nonlinear signal, second DPD on a baseband signal that goes through the first DPD includes: The predistortion module calculates, using a preset algorithm, the baseband signal that goes through the first DPD and the nonlinear signal, to obtain a DPD parameter; and the predistortion module performs, using the DPD parameter, the second DPD on the baseband signal that goes through the first DPD. The preset algorithm is any one of algorithms such as a neural network model, a Volterra Volterra polynomial, a memory polynomial MP, a normalized memory polynomial GMP, a Wiener-Hammerstein Wiener-Hammerstein polynomial, a cubic spline BBUbic spline, or a canonical piecewise-linear CPWL equation.

In a possible design, the optical component includes an electro-optic modulator, and the electrical component includes a power amplifier.

In a possible design, the optical component further includes a wavelength division multiplexer, and an input end of the wavelength division multiplexer is connected to an output end of the electro-optic modulator. The input end of the feedback link is connected to an output end of the wavelength division multiplexer; or the input end of the feedback link is connected between the wavelength division multiplexer and the electro-optic modulator.

In a possible design, one optical fiber is disposed between the BBU and the RRU, and the temperature value and an uplink signal and a downlink signal of the RoF system are transmitted through the optical fiber.

In a possible design, a first optical fiber and a second optical fiber are disposed between the BBU and the RRU. The downlink signal of the RoF system and the temperature value are transmitted through the first optical fiber, and the uplink signal of the RoF system is transmitted through the second optical fiber; or the downlink signal of the RoF system is transmitted through the first optical fiber, and the uplink signal of the RoF system or the temperature value is transmitted through the second optical fiber; or the uplink signal and the downlink signal of the RoF system are transmitted through the first optical fiber, and the temperature value is transmitted through the second optical fiber.

In a possible design, that the input end of the feedback link is connected to the output end of the optical component includes: the input end of the feedback link is directly connected to the output end of the optical component; or the input end of the feedback link is indirectly connected to the output end of the optical component using a linear element.

According to a third aspect, an embodiment of this application provides a DPD lookup table generation method. The method includes: selecting first temperature from a temperature set, where the temperature set includes at least one possible temperature of the electrical component according to the first aspect or any possible design of the first aspect in the embodiments of this application, and the first temperature is any temperature in the temperature set; determining a first nonlinear model used when the electrical component is at the first temperature; generating a first baseband signal, and performing up-conversion on the baseband signal, to obtain a radio frequency signal; inputting the radio frequency signal into the first nonlinear model, to generate a nonlinear radio frequency signal; performing down-conversion and low-pass filtering on the nonlinear radio frequency signal to obtain a nonlinear baseband signal; determining, based on the first baseband signal and the nonlinear baseband signal, a first DPD parameter corresponding to the first temperature; and repeating the foregoing steps until all temperatures in the temperature set are covered, to obtain a DPD parameter corresponding to each temperature in the temperature set; and generating a DPD lookup table based on each temperature in the temperature set and the DPD parameter corresponding to each temperature.

In a possible design, the determining, based on the first baseband signal and the nonlinear baseband signal, a first DPD parameter corresponding to the first temperature includes: calculating the first baseband signal and the nonlinear baseband signal using any one of algorithms such as a neural network model, a Volterra Volterra polynomial, a memory polynomial MP, a normalized memory polynomial GMP, a Wiener-Hammerstein Wiener-Hammerstein polynomial, a cubic spline cubic spline, or a canonical piecewise-linear CPWL equation, to obtain the first DPD parameter corresponding to the first temperature.

According to a fourth aspect, an embodiment of this application provides a computer-readable storage medium, where the computer-readable storage medium stores a computer program, the computer program includes program instructions, and when the program instructions are executed by a computer, the computer is enabled to perform the method in the second aspect or any possible design of the second aspect or the method in the third aspect or any possible design of the third aspect in the embodiments of this application.

According to a fifth aspect, an embodiment of this application provides a computer program product, where the computer program product includes computer program code, and when the computer program code is run on a computer, the computer is enabled to perform the method in the second aspect or any possible design of the second aspect or the method in the third aspect or any possible design of the third aspect in the embodiments of this application.

According to a sixth aspect, an embodiment of this application provides a processing apparatus, including at least one processor and a memory communicatively connected to the at least one processor, where the memory stores instructions that can be executed by the at least one processor, and the at least one processor executes the instructions stored in the memory, such that the method in the second aspect or any possible design of the second aspect or the method in the third aspect or any possible design of the third aspect in the embodiments of this application is performed.

According to a seventh aspect, an embodiment of this application provides a chip, where the chip is coupled to a memory, and is configured to read and execute program instructions stored in the memory, to implement the method in the second aspect or any possible design of the second aspect or the method in the third aspect or any possible design of the third aspect in the embodiments of this application.

BRIEF DESCRIPTION OF DRAWINGS

FIG. 5 is a flowchart of a nonlinear compensation method according to an embodiment of this application;

FIG. 6A and FIG. 6B each are a schematic diagram of a feedback link according to an embodiment of this application;

DESCRIPTION OF EMBODIMENTS

Currently, there are mainly three predistortion schemes for an RoF system.

Scheme 1: Analog Predistortion Scheme

Figure 1:
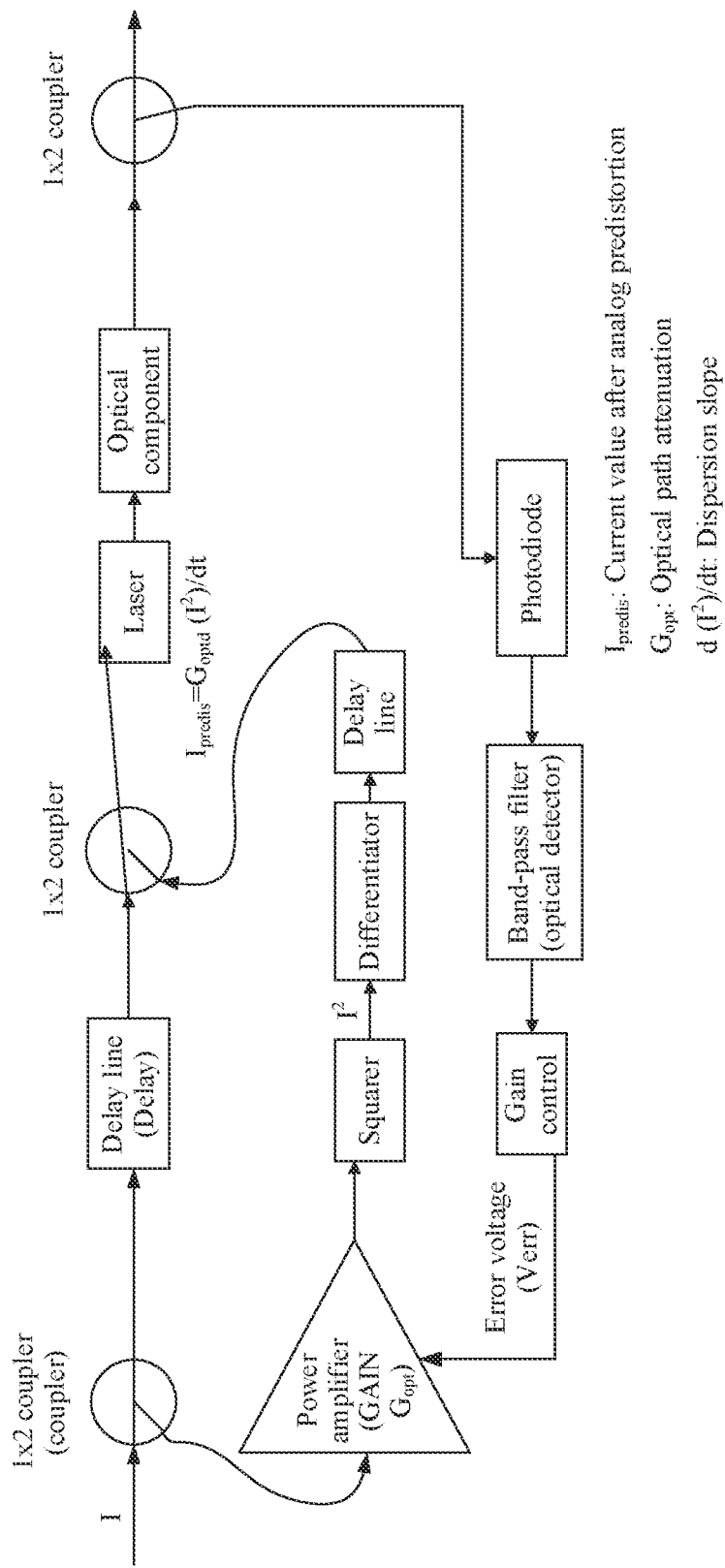
FIG. 1 is a schematic diagram of an analog predistortion scheme.

FIG. 1 is a schematic diagram of the analog predistortion scheme. A core of this scheme is an optical dispersion model based on by an optical fiber and another optical component. Theoretical analysis shows that dispersion distortion caused when an optical signal is transmitted in an RoF system is a function of a current input to a laser source. Therefore, corresponding analog predistortion processing is performed on the current input to the laser source, and compensation for optical domain dispersion can be achieved.

For example, it is assumed that $P_{out}(t)$ is output power of an optical detector (PD) of the RoF system, $P_{in}(t)$ is input power of radio frequency signals converging into the laser source, $\tau(\lambda)$ is a transmission delay of the optical signal and is a function related to a wavelength $\lambda$ of the optical signal, and $\alpha$ indicates attenuation of an entire RoF link. The following formula (Eq.1) is obtained.

$$P_{out}(t) = \frac{\alpha P_{in}(t - \tau(\lambda))}{\left[1 + \frac{\partial \tau}{\partial t}\right]} \quad \text{(Eq. 1)}$$

$1/[1+\partial\tau/\partial t]$ indicates a dispersion slope. The formula (Eq.1) shows dispersion of the RoF system. According to a power calculation formula $P=I^2R$, the input and output power of the RoF system can be expressed as a function of an input current I of the laser source. Therefore, analog predistortion is performed on the input current I, such that compensation can be performed for distortion caused by the dispersion of the RoF system.

However, in this scheme, compensation can only be performed for optical domain dispersion distortion caused by an optical component in the RoF system, and nonlinear distortion caused by the electrical component in the RoF system and nonlinear distortion caused by a memory characteristic of the component are not considered. In addition, the compensation scheme is sensitive to parameters such as a wavelength for transmitting a light wave, a length of an optical fiber, and an operating temperature of the component. Therefore, universality and robustness are relatively poor. Therefore, a linearization effect of the RoF system is still poor.

Scheme 2: Digital Predistortion (DPD) Scheme

Figure 2:
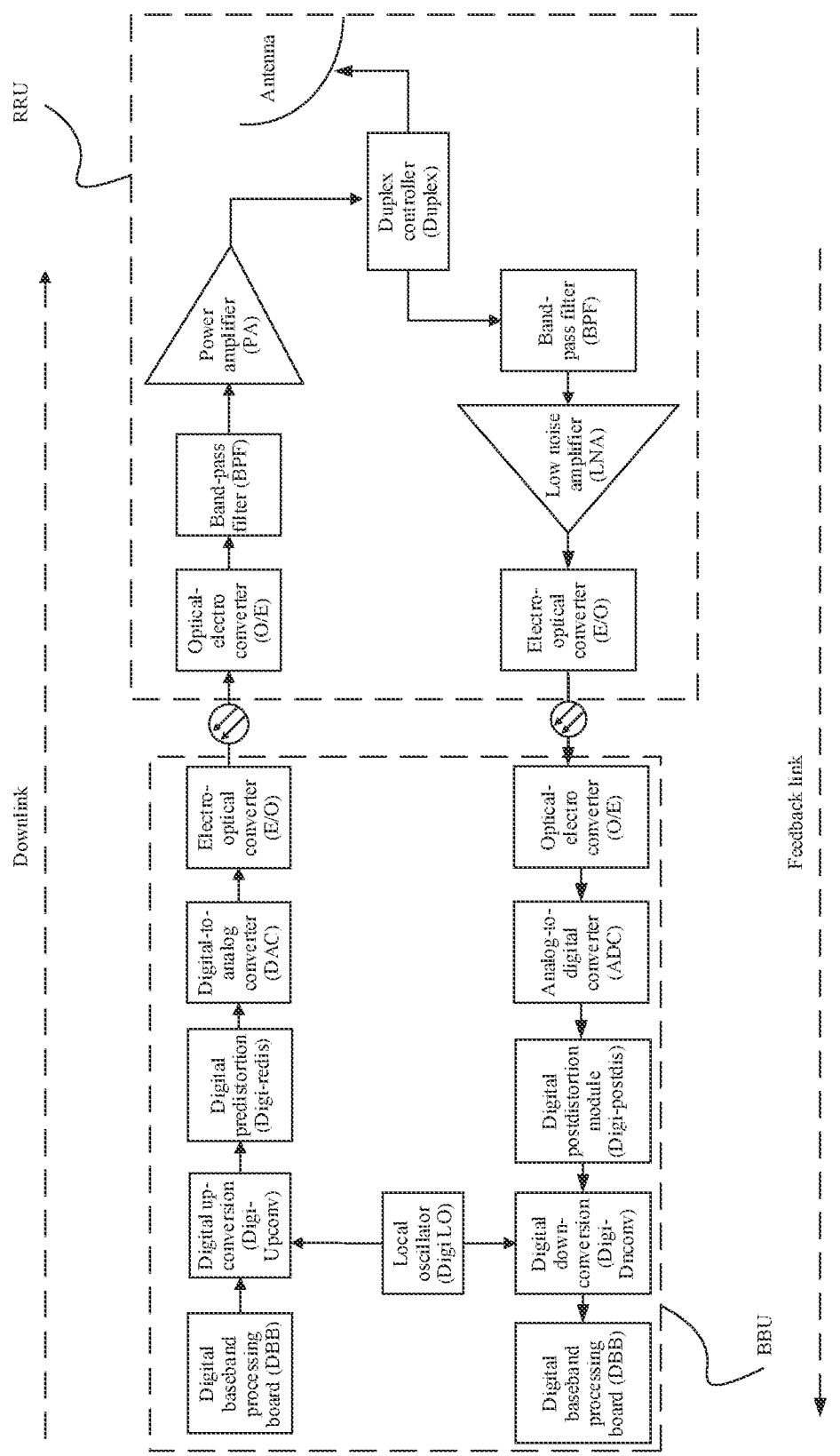
FIG. 2 is a schematic diagram of a digital predistortion scheme.

FIG. 2 is a schematic diagram of the digital predistortion scheme. In this scheme, a feedback link is disposed from an antenna on an RRU side to a BBU, such that one beam of a downlink signal of the RRU is sent out through the antenna, and the other beam of the downlink signal of the RRU is transmitted back to the BBU through the feedback link. A digital predistortion module (Digi predis) is disposed on the RRU side. The digital predistortion module may perform modeling on a nonlinear characteristic of a downlink based on an input signal of the downlink and a feedback signal transmitted back through the feedback link, and then perform digital predistortion on the downlink, to compensate for nonlinear distortion of the downlink.

It can be learned from FIG. 2 that, in this scheme, the feedback link needs to be established from the RRU side to the BBU side. To reduce hardware complexity, in this scheme, the feedback signal and uplink data share a same link. However, in this case, a control circuit needs to be added on the RRU side, to implement switching between an uplink signal and the feedback signal on the feedback link. In addition, new nonlinear components such as an EO/OE module, an optical fiber, and a power amplifier (PA) are introduced into the feedback link. Existence of the new nonlinear components also brings additional nonlinear distortion to the RoF system, such that a DPD operation finally performed by the predistortion module is actually modeling and compensation for nonlinearity of all uplinks and downlinks, instead of modeling and compensation only for nonlinearity of the downlink, which is actually needed. Therefore, a linearization effect of the RoF system is still poor.

Scheme 3: DPD Scheme Based on a Wavelength Division Multiplexer (WDM)

Figure 3:
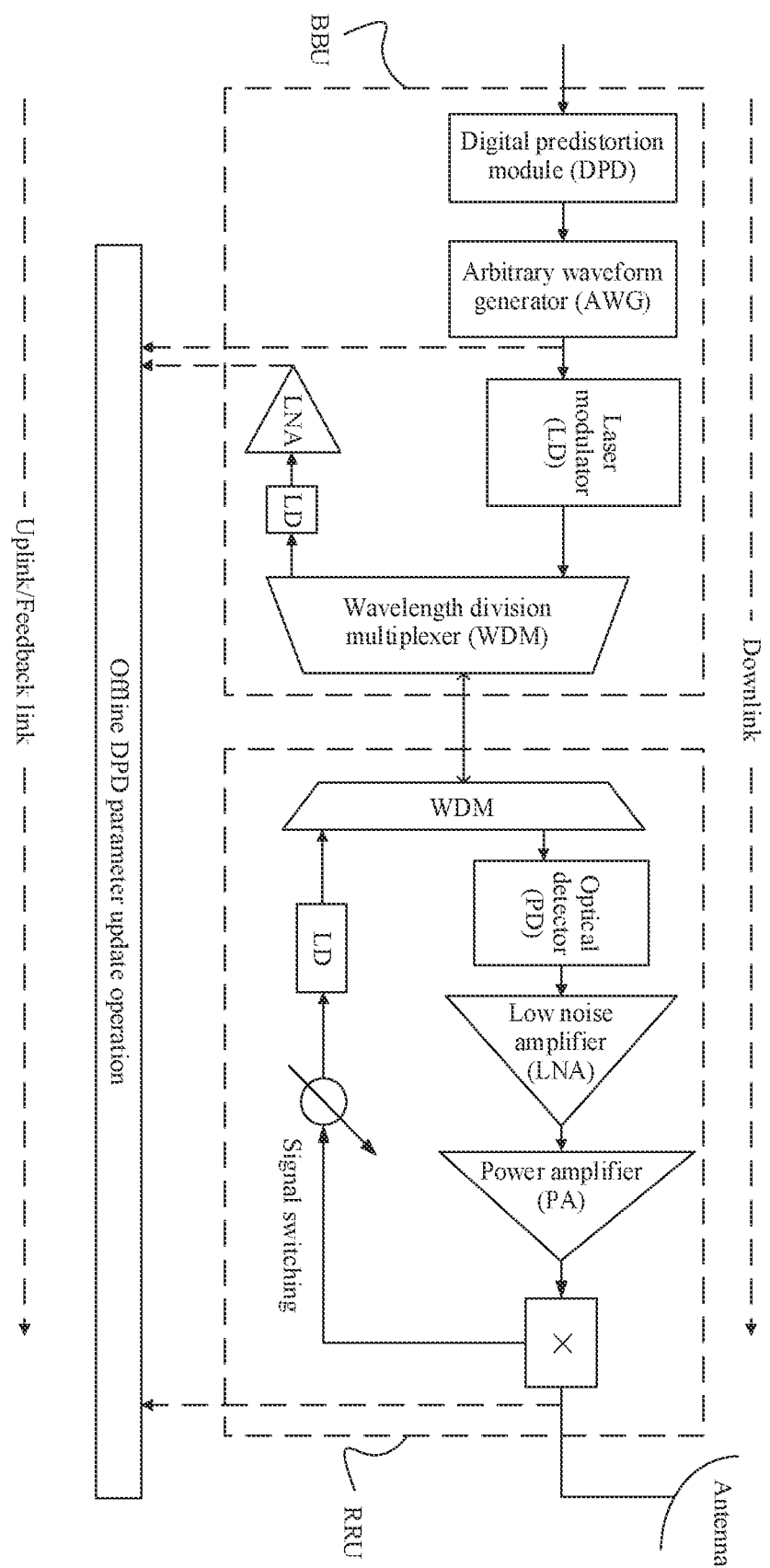
FIG. 3 is a schematic diagram of a linearization scheme of a WDM-based multi-wavelength RoF system.

FIG. 3 is a schematic diagram of a linearization scheme of a WDM-based multi-wavelength RoF system. In this scheme, due to introduction of the WDM component, one optical fiber may transmit signals of different wavelengths. In this way, the system may use different wavelengths to transmit uplink, downlink, and feedback information. For example, a wavelength of 1550 nm transmits a downlink data signal, and a wavelength of 1310 nm transmits uplink data and feedback information.

In this scheme, electrical domain digital compensation is also performed for nonlinearity of an entire link of the RoF system. Because nonlinear performance of the RoF link is in direct proportion to light intensity of a transmit signal, and intensity of the light intensity of the signal is directly related to intensity of a signal accessing a laser source, in this scheme, a variable attenuator is usually added to the feedback link to adjust intensity of a feedback signal. This can only reduce additional nonlinear distortion introduced by an E/O on the feedback link, but actually there is still additional distortion introduced to the feedback link (signal power attenuation and dispersion caused by a long feedback optical fiber). In addition, when a plurality of wavelengths transmit downlink data in parallel, the introduction of the WDM further causes problems such as four-wave mixing, optical domain crosstalk, and cross-modulation between a plurality of electrical domain signals, and may further introduce more nonlinearity, resulting in more complex DPD parameter learning. In addition, this scheme uses an offline DPD parameter estimation method, which still has a gap with an actual scenario-based application.

To resolve the foregoing one or more technical problems, embodiments of this application provide an RoF system and a nonlinear compensation method, to improve a linearization effect of the RoF system. The RoF system and the nonlinear compensation method provided in the embodiments of this application may be applied to various communications systems, for example, an LTE system, a 5th generation (5G) system such as new radio (NR), and a next generation (NG) communications system such as a 6th generation (6G) system. Certainly, the technical solutions in the embodiments of this application may also be applied to another communications system, for example, a satellite communications system or an internet of vehicles communications system.

The following clearly and completely describes the technical solutions in the embodiments of this application with reference to the accompanying drawings in the embodiments of this application.

Figure 4:
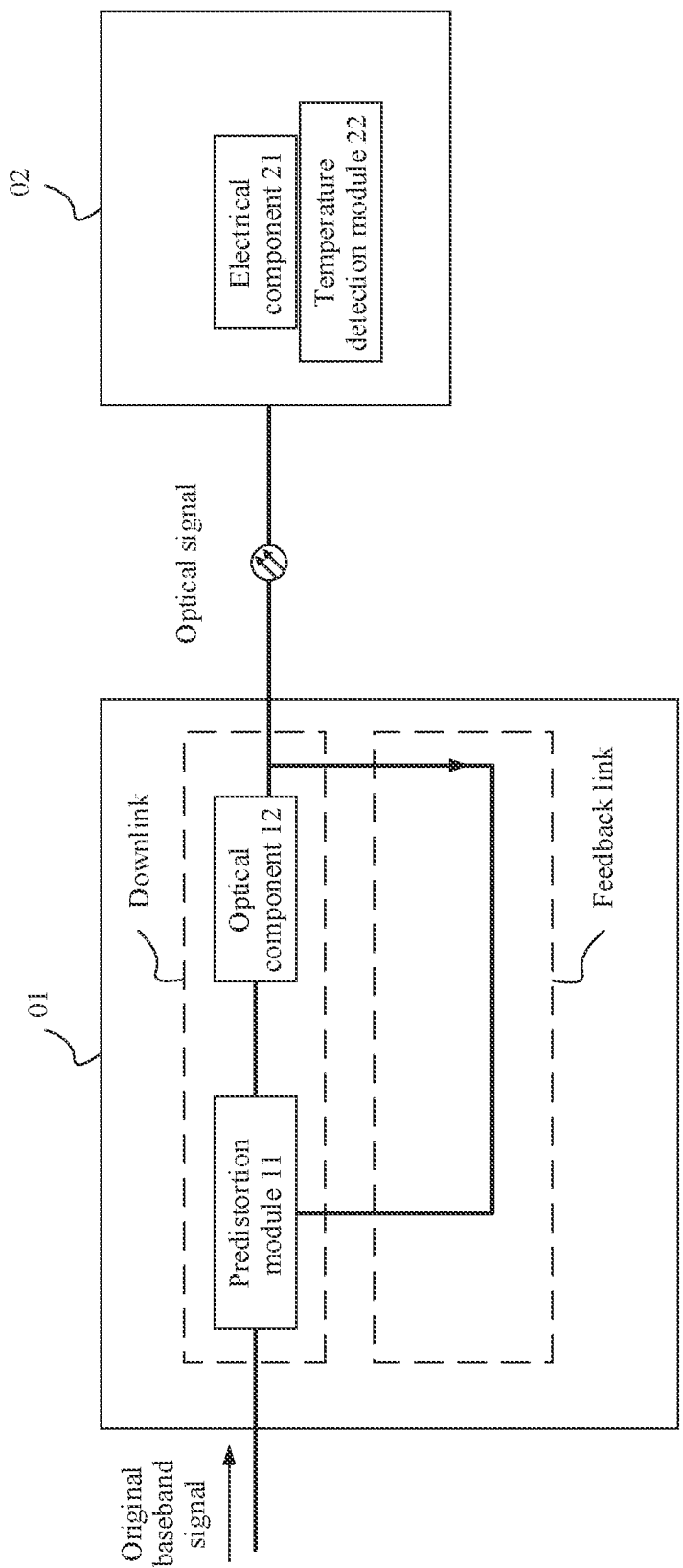
FIG. 4 is a schematic structural diagram of an RoF system according to an embodiment of this application.

FIG. 4 is a schematic structural diagram of an RoF system according to an embodiment of this application. The RoF system includes a baseband unit (e.g., a Building Baseband Unit (BBU)) 01 and a remote radio unit (RRU) 02. The BBU 01 and the RRU 02 are connected through an optical fiber. The RRU 02 includes an electrical component 21. The BBU 01 includes a downlink and a feedback link. A predistortion module 11 and an optical component 12 are disposed on the downlink. An input end of the feedback link is connected to an output end of the optical component 12, and an output end of the feedback link is connected to the predistortion module 11. The RoF system further includes a temperature detection module 22. The temperature detection module 22 may be disposed on the RRU 02, or disposed on the BBU 01, or partially disposed on the BBU 01 and partially disposed on the RRU 02. This is not limited herein. FIG. 4 shows an example in which the temperature detection module 22 is disposed on the RRU 02.

It should be understood that, unless otherwise specified, the "connection" in this specification may include two cases: a direct connection and an indirect connection. For example, the input end of the feedback link may be directly connected to the output end of the optical component 12, or the input end of the feedback link may be indirectly connected to the output end of the optical component 12 using another linear element. For example, a component that has relatively little or no impact on nonlinear distortion, for example, a resistor or a capacitor, may be disposed between the input end of the feedback link and the output end of the optical component 12. Similarly, the output end of the feedback link may also be directly connected to the predistortion module or indirectly connected to the predistortion module. Details are not described herein.

Hardware implementation of the predistortion module 11 may be implemented using a field programmable gate array (FPGA), an application-specific integrated chip (ASIC), a system-on-chip (SoC), a central processing unit (CPU), a network processor (NP), a digital signal processing circuit (DSP), a micro controller (e.g., a microcontroller unit (MCU)), a programmable logic device (PLD), another integrated chip, or the like. The predistortion module 11 may store and run software or a program corresponding to the nonlinear compensation method provided in the embodiments of this application, to implement the nonlinear compensation method provided in the embodiments of this application.

FIG. 5 shows an example method for performing nonlinear compensation on a downlink signal by the RoF system shown in FIG. 4. The method includes the following steps.

S501: The feedback link feeds back a nonlinear signal output by the optical component 12 to the predistortion module 11; and the temperature detection module 22 detects a temperature value of the electrical component 21, and sends the temperature value to the predistortion module 11.

S502: The predistortion module 11 performs a DPD operation on a baseband signal based on the temperature value and the nonlinear signal.

For example, the predistortion module 11 may separately perform modeling and compensation for optical domain nonlinearity and electrical domain nonlinearity.

(1) The predistortion module 11 performs first DPD on an original baseband signal based on the temperature value, to implement compensation (that is, electrical domain compensation) for nonlinear distortion caused by the electrical component 21.

(2) The predistortion module 11 performs, based on an output signal of the feedback link (that is, the nonlinear signal output by the optical component 12), second DPD on a baseband signal that goes through the first DPD, to implement compensation (that is, optical domain compensation) for nonlinear distortion caused by the optical component 12.

In this embodiment of this application, the predistortion module 11 in the RoF system separately performs modeling and compensation for optical domain nonlinearity and electrical domain nonlinearity. On one hand, the feedback link is directly connected to the output end of the optical component 12, such that a quantity of nonlinear components additionally introduced by the feedback link can be reduced, hardware complexity of the feedback link can be reduced, nonlinear distortion additionally introduced by the feedback link can further be greatly reduced or even avoided, and accuracy of performing optical domain nonlinear compensation by the RoF system can be improved; and on the other hand, the predistortion module 11 remotely monitors the temperature value of the electrical component 21, such that accuracy of performing electrical domain nonlinear compensation by the RoF system can be improved, hardware complexity of the RRU and the BBU can further be simplified, and nonlinear distortion can be avoided to be additionally introduced. In conclusion, in this embodiment of this application, a linearization effect of the RoF system can be improved, and hardware complexity of the RoF system can be reduced.

The following describes the optical component 12 and the electrical component 21 in the embodiments of this application.

In a possible design, the optical component 12 includes an electro-optic modulator (E/O), and the electrical component 21 includes a power amplifier (PA).

Generally, on the BBU side, the electro-optic modulator has greatest nonlinear impact on the RoF system. Therefore, a nonlinear signal output by the electro-optic modulator is fed back to the predistortion module 11, such that the predistortion module 11 can more accurately compensate for optical domain nonlinear distortion caused by the electro-optic modulator. On the RRU side, the PA is a main component that causes electrical domain nonlinearity. Therefore, a temperature value of the PA is fed back to the predistortion module 11, such that the predistortion module 11 can more accurately compensate for electrical domain nonlinear distortion caused by the PA, and optical domain nonlinear compensation and electrical domain nonlinear compensation can further be implemented.

In a possible design, if the RoF system is a multi-wavelength RoF remote system, in addition to the electro-optic modulator, the optical component 12 may further include a wavelength division multiplexer (WDM). An input end of the wavelength division multiplexer is (directly or indirectly) connected to an output end of the electro-optic modulator.

In this design, the feedback link may be designed in the following two manners.

Manner 1: Refer to FIG. 6A. The input end of the feedback link is connected to an output end of the wavelength division multiplexer. In this manner, a feedback signal obtained by the predistortion module can reflect a nonlinear characteristic caused by both the electro-optic modulator and the wavelength division multiplexer. Therefore, the predistortion module 11 can compensate for nonlinearity caused by both the electro-optic modulator and the wavelength division multiplexer, such that the downlink signal has a better linearization effect.

Figure 6B:
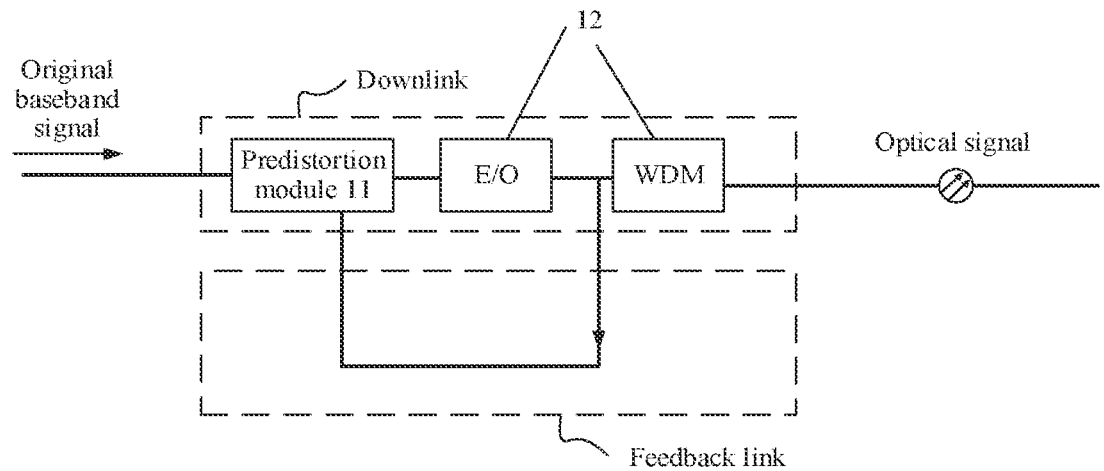

Manner 2: Refer to FIG. 6B. The input end of the feedback link is connected between the wavelength division multiplexer and the electro-optic modulator. In this manner, a feedback signal obtained by the predistortion module can reflect a nonlinear characteristic caused by the electro-optic modulator. Therefore, the predistortion module 11 may compensate for nonlinearity caused by the electro-optic modulator without considering nonlinear distortion caused by the WDM, such that calculation volume and complexity of the predistortion module 11 can be reduced, and operation efficiency can be improved.

It should be understood that the foregoing descriptions are merely examples of the optical component 12 and the electrical component 21 that may be used in the embodiments of this application, and cannot be used to limit specific types or quantities of the optical component 12 and the electrical component 21 in the embodiments of this application. For example, during implementation, the electrical component 21 may further include an attenuator, an optical-electrical converter, and the like; and the optical component 12 may further include an electrical-to-optical converter, an optical domain amplifier, an optical splitter, and the like.

Further, if there are a plurality of optical components 12, the input end of the feedback link may be connected to an output end of the last optical component, such that the feedback signal can reflect nonlinear characteristics of all the optical components 12, and the predistortion module 11 can compensate for overall optical domain nonlinear distortion of the downlink.

Further, if there are a plurality of electrical components 21, temperature monitoring may be performed on each electrical component, and compensation is performed, based on temperature of each electrical component, for nonlinear distortion caused by the electrical component.

The following describes an example implementation of the temperature detection module 22.

In a possible design, the temperature detection module 22 in this embodiment of this application may be implemented by a thermistor. For example, the thermistor may be disposed on the RRU 02 and is closely attached to the electrical component 21.

Figure 7A:
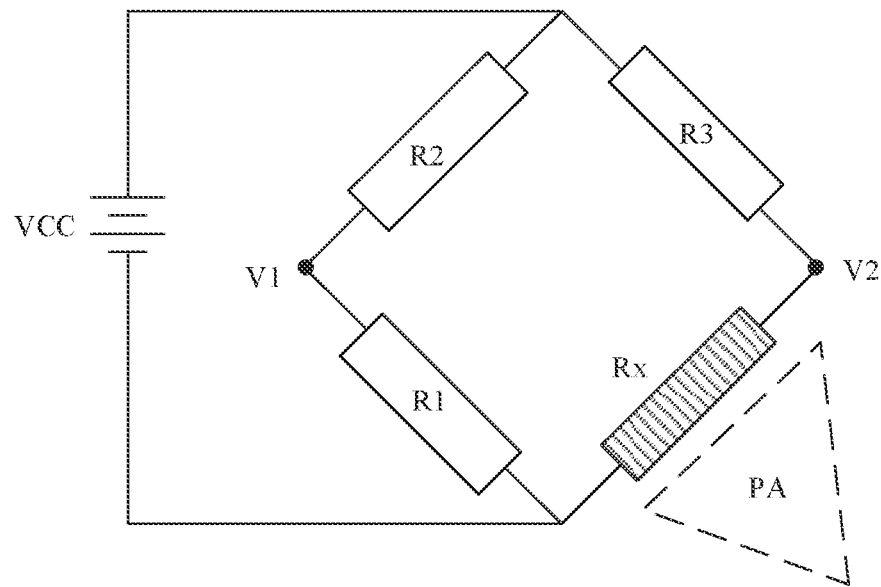
FIG. 7A and FIG. 7B each are a schematic diagram of a temperature detection module 22 according to an embodiment of this application.

FIG. 7A is a possible implementation of measuring temperature by the thermistor. First, a thermistor Rx is attached to a target electrical component 21 (the power amplifier PA is used as an example in FIG. 7A). Then, the thermistor Rx and other three fixed-value resistors (R1, R2, and R3) whose resistance values are known are connected to a Wheatstone bridge, and the Wheatstone bridge is connected to a direct current voltage source VCC (in FIG. 6A, a battery is used to represent a power supply, but in actual application, the power supply is not limited to the battery and may be a direct-current voltage source with a stable voltage). When temperature of the PA changes, a resistance of the thermistor changes, and a voltage between two arms of the Wheatstone bridge also changes. A voltage difference is:

$$\Delta V = V1 - V2 = VCC \times \left(\frac{R2}{R1+R2} - \frac{R3}{R3+Rx}\right) = VCC \times \left(\frac{R2 \times Rx - R3 \times R1}{(R1+R2)(R3+Rx)}\right) \quad \text{(Eq. 2)}$$

In this case, the temperature of the PA may be determined according to a voltage difference-temperature value correspondence table.

In another possible design, the temperature detection module 22 may be implemented using a sensing optical fiber and a Raman optical time domain reflectometer.

Figure 7B:
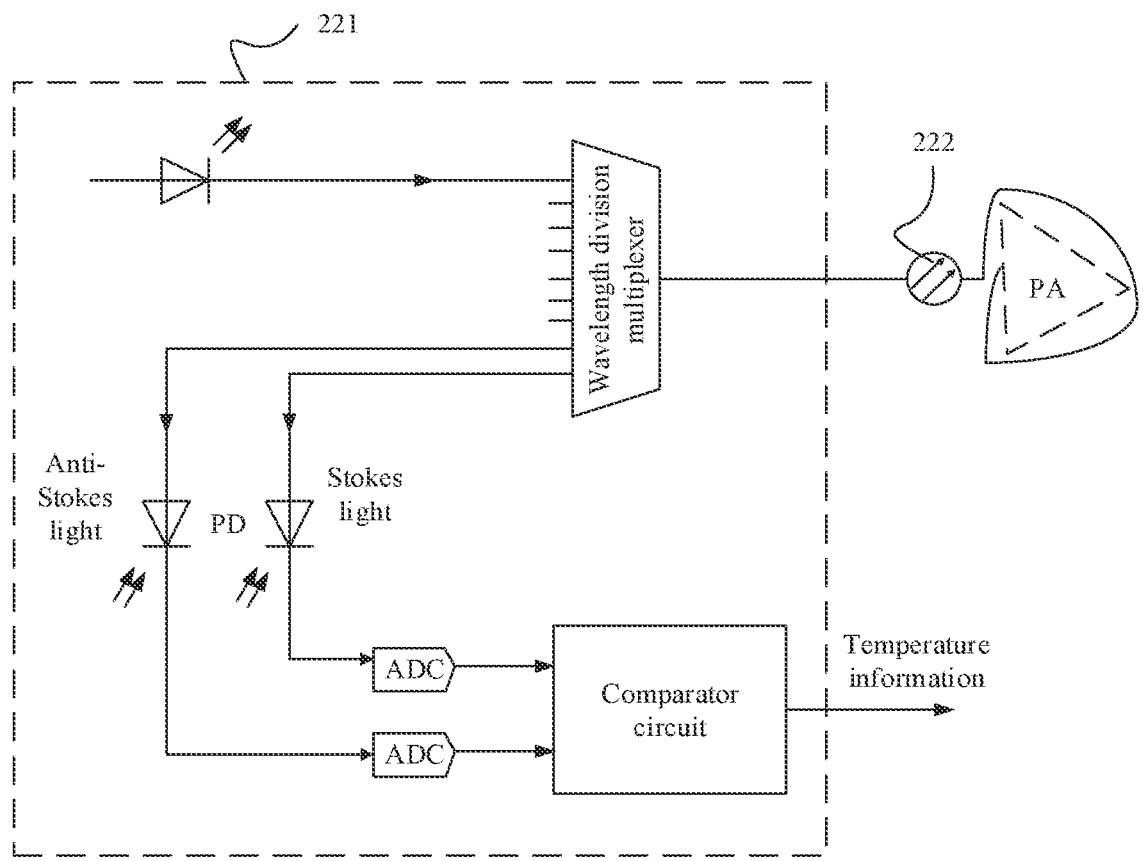

For example, refer to FIG. 7B. The temperature detection module 22 includes a Raman optical time domain reflectometer 221 and a sensing optical fiber 222. The sensing optical fiber 222 is disposed on the RRU 02 and is closely attached to the electrical component 21 (in FIG. 7B, the PA is used as an example, and the sensing optical fiber 222 coils around the PA). The Raman optical time domain reflectometer 221 includes a wavelength division demultiplexer, an optical detector (PD), an analog-to-digital converter (ADC), and a comparator circuit. The Raman optical time domain reflectometer is disposed on the BBU 01, and is connected to the predistortion module 11.

The sensing optical fiber may sense temperature of the electrical component 21 to generate a Raman scattering optical signal, and feed back the Raman scattering optical signal to the Raman optical time domain reflectometer. The Raman optical time domain reflectometer determines the temperature of the electrical component 21 based on the Raman scattering optical signal.

For example, when the optical signal is transmitted in the optical fiber, scattering light may be generated. Raman scattering is related to thermal vibrations of fiber molecules. Therefore, the Raman scattering is sensitive to temperature and can be used for temperature measurement. Raman scattering light includes two frequencies of light. Stokes light and anti-Stokes light. Their frequencies are distributed on two sides of an incident light frequency and the Stokes light and the anti-Stokes light travel backwards. The anti-Stokes scattering light is sensitive to temperature and intensity of the anti-Stokes scattering light is modulated by the temperature. However, the Stokes scattering light is basically irrelevant to temperature, and therefore a ratio of light intensity of the Anti-Stokes scattering light to light intensity of the Stokes scattering light is only related to temperature of the optical fiber. Therefore, the optical fiber can be used for sensing the temperature.

It should be understood that the thermistor and the Raman optical time domain reflectometer are merely used as examples of the temperature detection module 22 instead of limitations, and may be implemented in another manner during implementation. This is not limited in this embodiment of this application.

The following describes an example implementation in which the predistortion module 11 performs the first DPD on the original baseband signal based on the temperature value.

In a possible design, the predistortion module 11 may prestore a correspondence between the temperature of the electrical component 21 and a DPD parameter. When performing the first DPD on the original baseband signal based on the temperature value, the predistortion module 11 directly determines, according to the correspondence, a DPD parameter corresponding to the temperature value, and then performs the first DPD on the original baseband signal based on the determined DPD parameter.

For example, the electrical component 21 is a PA. It is assumed that nonlinear amplification occurs after an analog signal goes through the power amplifier PA. When a memory characteristic of the PA is not considered, mathematical modeling is performed on a nonlinear action of the PA, and calculation formulas of an amplitude A(r) and a phase Ø(r) of an amplified output signal may be obtained.

$$A(r) = \frac{L}{s}\ln\left[\frac{1+e^{s(\frac{gr}{L}+1)}}{1+e^{s(\frac{gr}{L}-1)}}\right] - L \quad \text{(Eq. 3)}$$

$$\phi(r) = [(a-b)r + c - d]\frac{A'(r)}{g} + br + d \quad \text{(Eq. 4)}$$

$$\frac{A'(r)}{g} = \left[\frac{\left(e^{s(\frac{gr}{L}+1)} - e^{s(\frac{gr}{L}-1)}\right)}{\left[1+e^{s(\frac{gr}{L}+1)}\right]\left[1+e^{s(\frac{gr}{L}-1)}\right]}\right] \quad \text{(Eq. 5)}$$

g is a small signal amplification gain, r is an amplitude of an input signal, L is a maximum signal amplification amplitude, s is a smoothing parameter, a is a phase change gradient value when the PA operates linearly, b is a phase change gradient value when the PA is in a saturated state, c is an initial phase value when the PA has no signal input, and d is a phase correction value when the PA is in a saturated state. Based on an amplitude-amplitude (AM-AM) conversion diagram and a phase-amplitude (PM-AM) conversion diagram obtained through actual testing by the PA, nonlinear model fitting of the PA can be implemented by adjusting the parameter values in the foregoing formulas. When operating temperature of the PA changes, the AM-AM curve and the PM-AM curve change accordingly. In this case, the parameters in the foregoing formulas need to be finely adjusted to complete model fitting again. When a memoryless model of the PA is coupled to the operating temperature of the PA, a model set related to the temperature is obtained.

Further, the DPD operation is performed based on different PA models, and DPD parameters are recorded to form a lookup table (storing a correspondence between the temperature of the electrical component 21 and the DPD parameter). The lookup table may perform, based on the temperature of the PA, addressing to obtain DPD parameter values corresponding to different temperature values.

Figure 8:
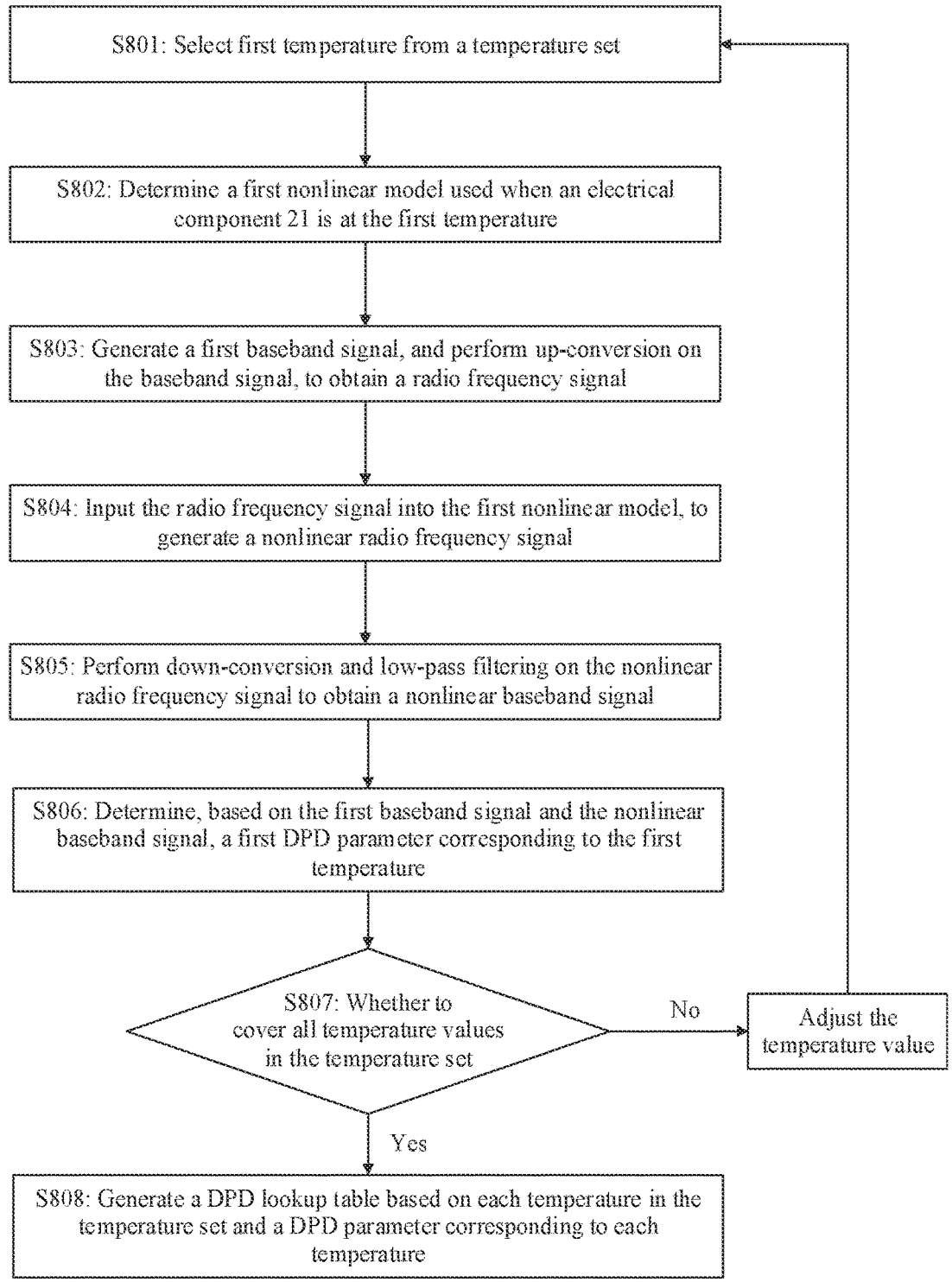
FIG. 8 is a flowchart of a DPD lookup table generation method according to an embodiment of this application.

FIG. 8 shows a DPD lookup table generation method according to an embodiment of this application. The method includes the following steps:

S801: Select first temperature from a temperature set, where the temperature set includes at least one possible temperature of the electrical component 21, and the first temperature is any temperature in the temperature set.

S802: Determine a first nonlinear model used when the electrical component 21 is at the first temperature.

S803: Generate a first baseband signal, and perform up-conversion on the baseband signal, to obtain a radio frequency signal.

S804: Input the radio frequency signal into the first nonlinear model, to generate a nonlinear radio frequency signal.

S805: Perform down-conversion and low-pass filtering on the nonlinear radio frequency signal to obtain a nonlinear baseband signal.

S806: Determine, based on the first baseband signal and the nonlinear baseband signal, a first DPD parameter corresponding to the first temperature.

For example, the first baseband signal and the nonlinear baseband signal may be calculated herein using any one of algorithms such as a neural network model, a Volterra polynomial, a memory polynomial (MP), a normalized memory polynomial (GMP), a Wiener-Hammerstein polynomial, a cubic spline, or a canonical piecewise-linear equation (CPWL), to obtain the first DPD parameter corresponding to the first temperature.

S807: Determine whether all temperatures in the temperature set are covered; if yes, perform step S808; otherwise, return to step S801 to adjust the temperature value and repeat steps S802 to S806 until all the temperatures in the temperature set are covered.

S808: Generate the DPD lookup table based on each temperature in the temperature set and a DPD parameter corresponding to each temperature.

During implementation, an operator may store the DPD lookup table in the predistortion module 11 in advance. In this way, when the RoF system processes a downlink signal, the predistortion module 11 may directly read the DPD lookup table to perform nonlinear compensation on the downlink signal. In addition, the operator may also store the algorithms shown in FIG. 8 in the predistortion module 11, and the predistortion module 11 may directly run the algorithms to generate the DPD lookup table, or run the algorithms to update an original DPD lookup table.

It should be noted that, during implementation, in addition to modeling and compensation for electrical domain nonlinear distortion of the RoF system based on the temperature of the electrical component 21, if the electrical component 21 has another attribute that affects the electrical domain nonlinear distortion, modeling and compensation may further be performed for the electrical domain nonlinear distortion of the RoF system based on the other attribute, for example, a material of the PA (gallium arsenide, gallium nitride, or the like).

In a possible design, the temperature detection module 22 may transmit an updated temperature value to the predistortion module 11 only when detecting that the temperature value of the electrical component 21 is updated (changed); or the temperature detection module 22 periodically transmits the temperature value to the predistortion module 11 at a specified time interval. This is not limited in this embodiment of this application. In this way, the temperature detection module 22 may be prevented from frequently sending the temperature value to the predistortion module, and system power consumption can be reduced.

An example implementation in which the temperature detection module 22 determines that the temperature value is updated may be: if determining that a difference between current temperature and temperature that is latest sent reaches a specified threshold, the temperature detection module 22 determines that the temperature value of the electrical component 21 is updated.

The specified threshold may be related to distribution of temperature values in the DPD lookup table. For example, if the distribution of the temperature values in the DPD lookup table is 0° C. to 100° C., and an interval between adjacent temperature values is 1° C., that is, "0° C., 1° C., 2° C., 3° C., . . . , 98° C., 99° C., and 100° C.", the specified threshold may be set to PC or an integer multiple of PC. In this way, it can be ensured that a corresponding DPD parameter of a temperature value sent by the temperature measurement module 22 to the predistortion module 11 exists in the DPD lookup table, such that reliability of electrical domain nonlinear compensation is further ensured.

The following describes an example implementation in which the predistortion module 11 performs, based on the output signal of the feedback link, the second DPD on the baseband signal that goes through the first DPD.

For example, the predistortion module 11 may calculate, using a preset algorithm, the baseband signal that goes through the first DPD and the nonlinear signal, to obtain a DPD parameter; and then perform, using the DPD parameter, the second DPD on the baseband signal that goes through the first DPD.

The preset algorithm includes but is not limited to the following machine learning algorithms: a neural network model, a Volterra polynomial, a memory polynomial (MP), a normalized memory polynomial (GMP), a Wiener-Hammerstein polynomial, a cubic spline (cubic spline), a canonical piecewise-linear equation (CPWL), or the like.

The memory polynomial is used as an example. It is assumed that an input signal (the baseband signal that goes through the first DPD) is x(n), and an output of the downlink is y(n) (which refers to as an output on the BBU side). Nonlinearity of the downlink signal may be represented using the following formula below.

$$y(n) = \sum_{k=0}^{K-1}\sum_{m=0}^{M-1} a_{km}x(n-m)|x(n-m)|^k \qquad (Eq.\ 6)$$

$a_{km}$ represents a parameter of a nonlinear item at a $k^{th}$ order when a memory depth is m.

Then, an output signal of a nonlinear system is fed back, and an inverse-distortion model is established between the output signal of the nonlinear system and a transmit signal, which is expressed as shown below.

$$x(n) = \sum_{k=0}^{K-1}\sum_{m=0}^{M-1} w_{km}y(n-m)|y(n-m)|^k \qquad (Eq.\ 7)$$

A parameter vector $W=[w_{11}, w_{12}, \ldots w_{km}, \ldots]$ is obtained by solving the formula (Eq.7), and then the parameter W may be used as the DPD parameter to perform the DPD operation.

Figure 9A:
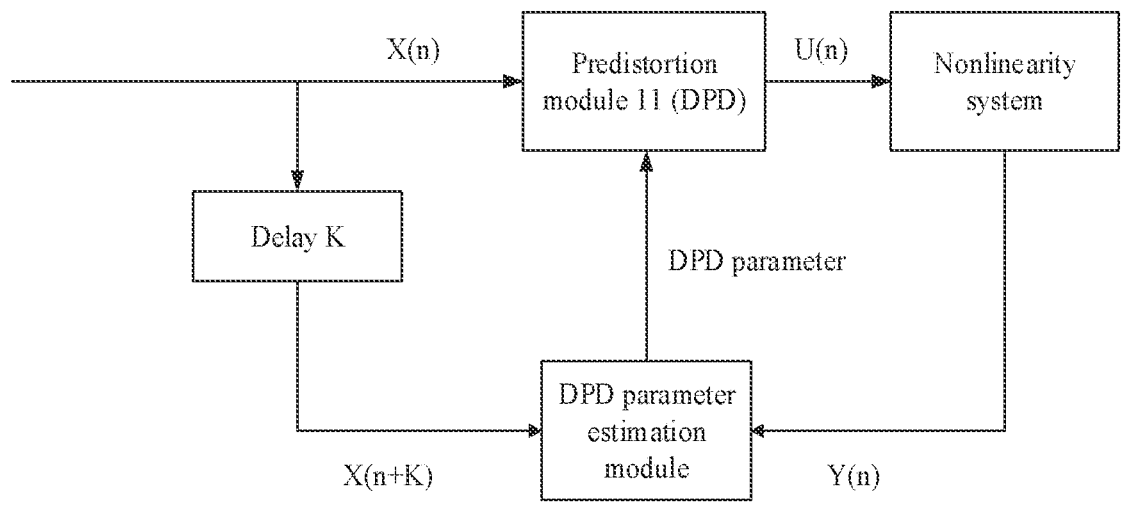
FIG. 9A is a schematic diagram of DPD technology parameter estimation based on a direct learning architecture.
Figure 9B:
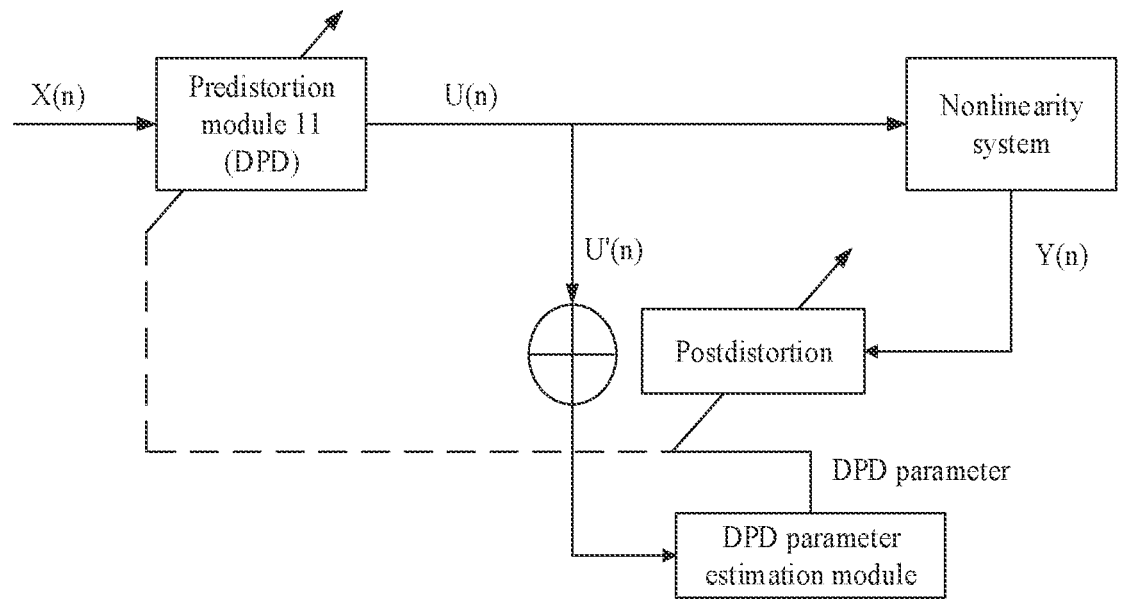
FIG. 9B is a schematic diagram of DPD technology parameter estimation based on an indirect learning architecture.

There may be two architectures for DPD technology parameter estimation: (1) As shown in FIG. 9A, in a direct learning architecture, a feedback signal Y(n) and a downlink signal X(n+k) before the DPD operation is performed are used to perform the DPD parameter estimation (in order to align the feedback signal with the downlink signal in time, a delay k needs to be performed on the downlink signal, that is, X(n) is converted into X(n+k)); and (2) As shown in FIG. 9B, in an indirect learning architecture, a feedback signal Y(n) and a downlink signal U(n) after the DPD operation is performed (that is, an input signal of the predistortion module 11) are used to perform the DPD parameter estimation.

The formula (Eq.7) may be solved using an algorithm such as a least square method, a least mean square method, or a singular value decomposition method. This is not limited in this embodiment of this application.

The following describes a manner of disposing an optical fiber between the BBU 01 and the RRU 02 in this embodiment of this application.

For example, one or more optical fibers may be disposed between the BBU 01 and the RRU 02 to transmit signals between the BBU 01 and the RRU 02.

For example, one optical fiber is disposed between the BBU 01 and the RRU 02, and a temperature value, an uplink signal, a downlink signal, and the like are all transmitted through the optical fiber.

For example, two optical fibers may be disposed between the BBU 01 and the RRU 02, for example, a first optical fiber and a second optical fiber. In this case, signal transmission between the BBU 01 and the RRU 02 may include the following several allocation manners: (1) The downlink signal and the temperature value of the RoF system are transmitted through the first optical fiber, and the uplink signal of the RoF system is transmitted through the second optical fiber; (2) The downlink signal of the RoF system is transmitted through the first optical fiber, and the uplink signal or the temperature value of the RoF system is transmitted through the second optical fiber; and (3) The uplink signal and the downlink signal of the RoF system are transmitted through the first optical fiber, and the temperature value is transmitted through the second optical fiber.

Figure 10A:
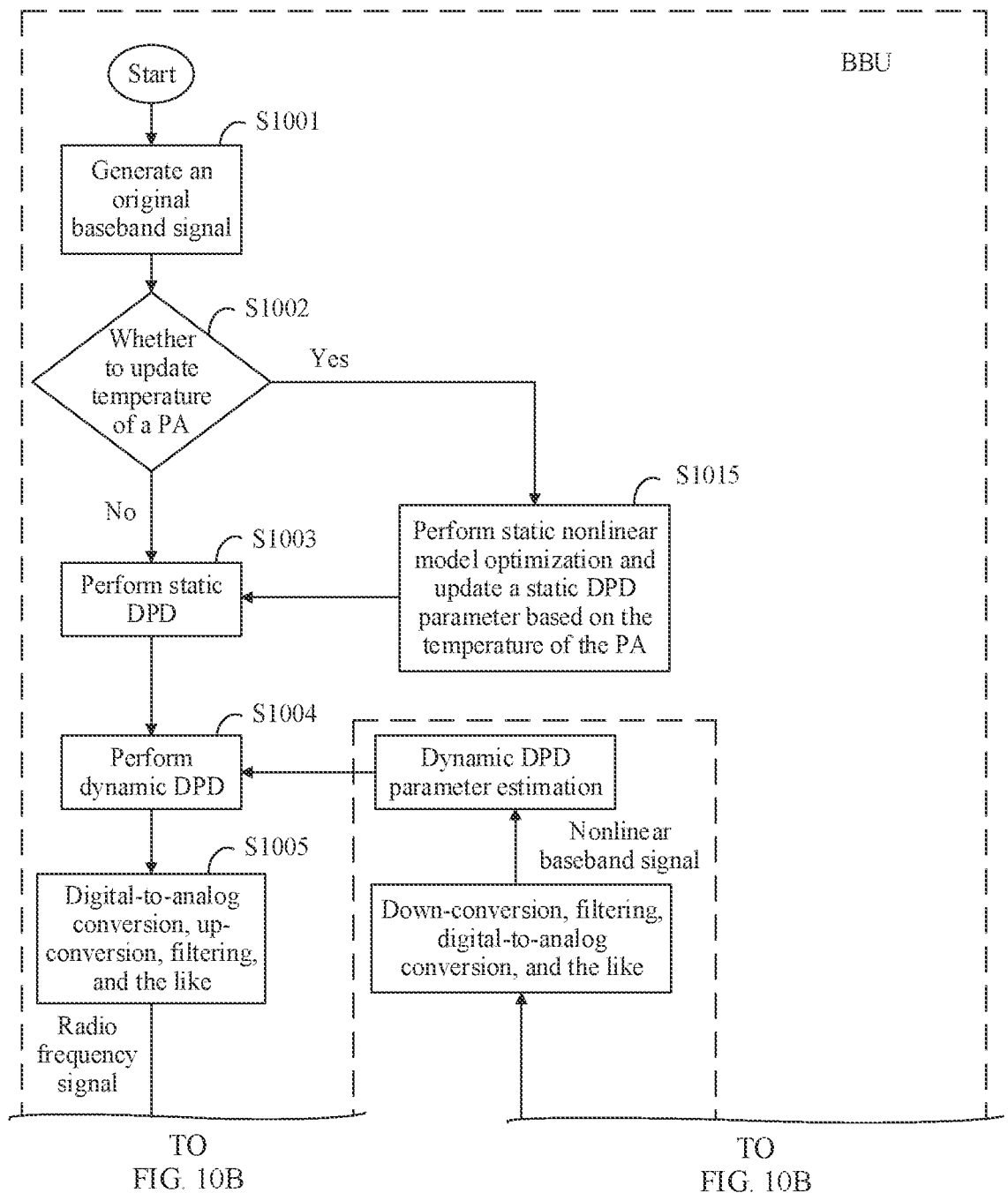
FIG. 10A and FIG. 10B are a flowchart of a downlink signal processing method according to an embodiment of this application.
Figure 10B:
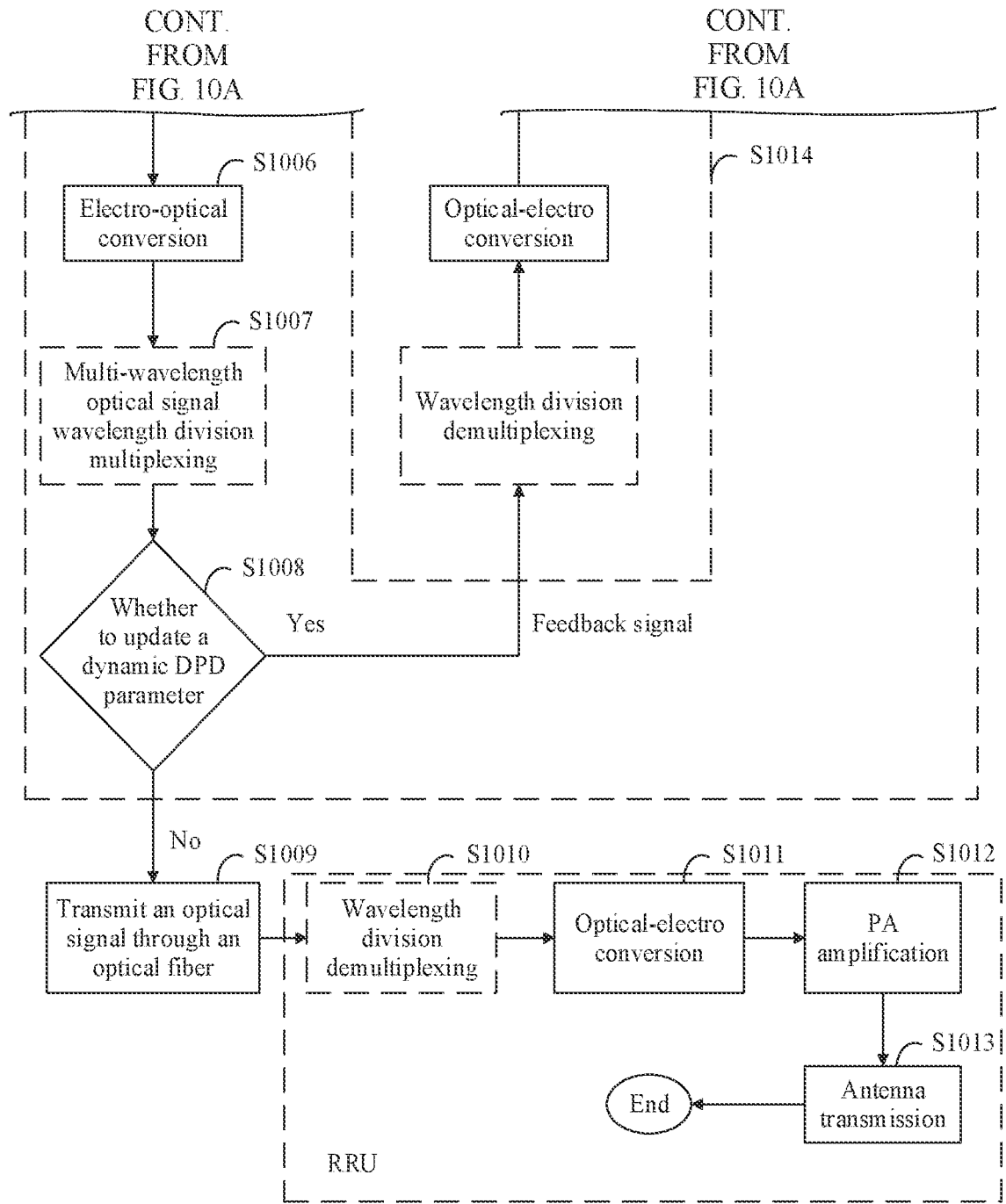

The foregoing describes implementations of the modules in the RoF system. The following describes an overall process of processing the downlink signal of the RoF system. Refer to FIG. 10A and FIG. 10B. The overall process includes the following steps:

S1001: Generate a digital baseband signal.

S1002: Determine whether temperature of a PA needs to be updated; if the temperature of the PA needs to be updated, perform step S1015 (perform static nonlinear model optimization and update a static DPD parameter based on the temperature of the PA); otherwise, continue to perform step S1002.

S1003: Perform a static DPD operation (that is, the foregoing first DPD) on a downlink signal based on a DPD parameter determined in step S1016.

S1004: Perform a dynamic DPD operation, that is, the foregoing second DPD, where a parameter of the dynamic DPD is obtained in step S1014 (wavelength division demultiplexing, optical-electrical conversion, down-conversion, filtering, digital-to-analog conversion, and the like are performed on a feedback signal to obtain a nonlinear digital baseband signal, and a dynamic DPD parameter is obtained based on an original baseband signal and the nonlinear baseband signal).

S1005: Perform digital-to-analog conversion, up-conversion, filtering, and the like on the signal obtained after the dynamic DPD, to generate a radio frequency signal.

S1006: Perform electrical-to-optical conversion on the radio frequency signal, to generate an optical signal.

S1007: If a plurality of wavelengths transmit downlink data in parallel, a multi-wavelength optical signal wavelength division multiplexing operation needs to further be performed.

S1008: Obtain downlink output of the BBU side, determine whether the dynamic DPD parameter needs to be updated, and if the dynamic DPD parameter needs to be updated, perform step S1015; otherwise, continue to perform step S1009.

S1009: Transmit the downlink signal to the RRU side through an optical fiber.

S1010: If the plurality of wavelengths transmit the downlink data in parallel, a multi-wavelength optical signal wavelength division demultiplexing operation needs to further be performed on the RRU side.

S1011: Convert the optical signal into an electrical signal.

S1012: Perform a power amplification operation on the electrical signal, to obtain a radio frequency signal.

S1013: Transmit the radio frequency signal through an antenna.

According to the foregoing process, a downlink signal with good linearization can be sent through the antenna.

The implementations of the embodiments of this application may be combined with each other to achieve different technical effects. The following uses several examples for description.

Example 1

Figure 11A:
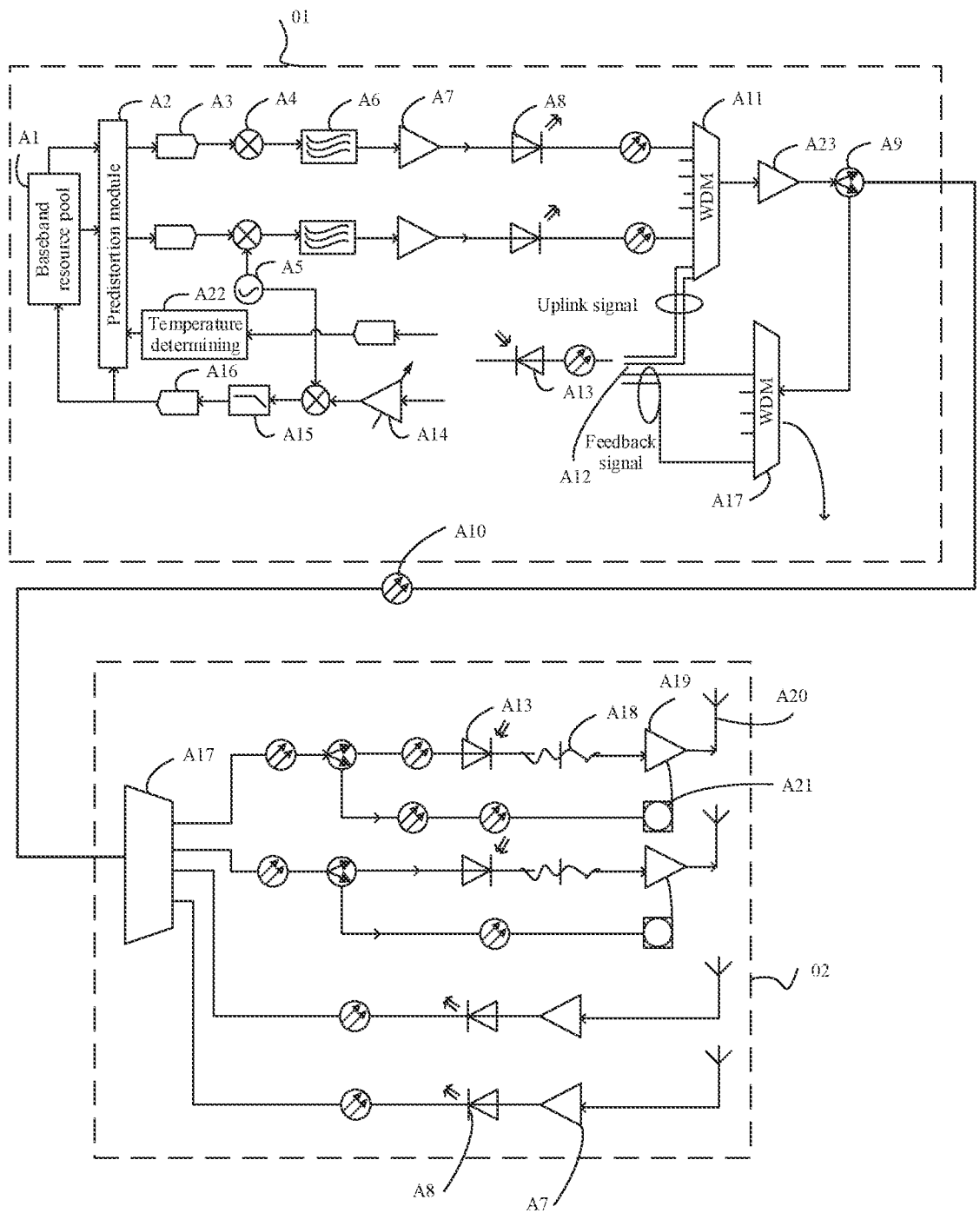
FIG. 11A is a schematic structural diagram of another possible RoF system according to an embodiment of this application.

FIG. 11A is a schematic structural diagram of another possible RoF system according to an embodiment of this application.

The following first describes labels of components in a unified manner.

A1: Baseband resource pool. The baseband resource pool is responsible for generating downlink baseband data and receiving uplink baseband data.

A2: Predistortion module. The predistortion module includes a quasi-static-dynamic cascaded DPD module, a corresponding parameter estimation module, and a quasi-static PA model lookup table.

A3: Digital-to-analog converter (DAC). The digital-to-analog converter converts a digital baseband signal into a baseband analog signal.

A4: Frequency mixer. The frequency mixer implements an up/down-conversion operation.

A5; Local oscillator. The local oscillator provides a radio frequency carrier.

A6: Band-pass filter

A7: Low noise amplifier

A8: Electro-optic modulation (E/O) module. The electro-optic modulation (E/O) module converts a radio frequency signal into an optical signal, and may be a direct modulator or an external modulator.

A9: Optical splitter. The optical splitter divides one optical signal into two beams of optical signals. A power ratio between the two beams of optical signals is determined by a selected splitter. In the present disclosure, a power ratio of 9:1 is used. A downlink signal from a BBU to an RRU accounts for 90% of power, and an optical signal accounting for 10% is used as local feedback.

A10: Optical fiber. A length of the optical fiber in a local feedback link cannot exceed 10 m. A length of an optical fiber between a BBU and an RRU ranges from 5 kilometers (km) to 50 km.

A11: Wavelength division multiplexer. The wavelength division multiplexer converges optical signals of a plurality of wavelengths.

A12: Optical switch. The optical switch selects a required wavelength signal to pass through.

A13: Optical detector (PD, O/E). The optical detector converts an optical signal into an electrical signal.

A14: Gain-tunable amplifier

A15: Low-pass filter

A16: Analog-to-digital converter (ADC). The analog-to-digital converter converts a baseband analog signal into a baseband digital signal.

A17: Wavelength division demultiplexer. The wavelength division demultiplexer distributes a plurality of wavelength signals transmitted on one beam of optical fiber to different ports for output.

A18: Attenuator. The attenuator can be a fixed attenuator or a variable attenuator A19: Power amplifier PA A20: Antenna A21: Sensing optical fiber. The sensing optical fiber coils around a PA on an RRU side to sense temperature of the PA.

A22: Raman optical time domain reflectometer (ROTDR). The Raman optical time domain reflectometer determines temperature of a remote sensing optical fiber.

A23: Optical domain amplifier

The RoF system in this example includes at least one uplink, one downlink, and one local feedback link. The optical splitter splits an optical signal that passes through the wavelength division multiplexer into two beams. One beam transmits downlink data, and the other beam is for local feedback. The local feedback optical signal is first split into a plurality of beams of signals by the wavelength division demultiplexer based on wavelengths, and optical signals of different wavelengths are sequentially sent using the optical switch to a local PD in a time division multiplexing manner. The downlink cooperates with an electrical switch to select to receive a local feedback data signal or an uplink signal. The uplink signal herein may be an uplink data signal, or may be a Raman scattering optical wave for monitoring temperature. On the remote RRU side, the sensing optical fiber coils around the PA. Received optical information is split by the optical splitter into two beams. One beam is transmitted to a radio frequency link, and the other beam is transmitted to the sensing optical fiber. The BBU side remotely monitors the temperature of the PA using the ROTDR. Based on the local feedback signal and the temperature information of the remote PA, parameters required by the DPD operation can be obtained using a polynomial method and parameter estimation methods such as a static/quasi-static model and a neural network.

Compared with the conventional technology, in this example, a multi-channel two-layer cascaded DPD architecture is used, and modeling and compensation are separately performed for optical domain nonlinearity and electrical domain nonlinearity. The electrical domain nonlinear modeling and compensation is implemented by remotely monitoring the temperature of the PA on the BBU side. A monitoring operation and a circuit are disposed on the BBU side, such that system hardware complexity can be reduced. In addition, on the BBU side, modeling and compensation are performed, based on the temperature information, for nonlinearity introduced by the PA, such that additional nonlinearity introduced by a design of detecting a complex feedback link from the RRU side to the BBU side in the conventional technology can be avoided. The optical domain nonlinear modeling and compensation is implemented by establishing a signal feedback link locally in the BBU. The link includes a plurality of types of optical components, such as an electrical-to-optical converter, a wavelength division multiplexer, a wavelength division demultiplexer, and a possible optical amplifier, such that the DPD technology in this scheme can uniformly compensate for nonlinear distortion generated by the plurality of types of optical components (cases such as four-wave mixing and adjacent-wavelength crosstalk introduced by many optical components are considered), such that accuracy of the optical domain nonlinear compensation can be improved. In addition, the optical fiber temperature measurement method has high accuracy and is not easily affected by electromagnetic interference.

Example 2

Figure 11B:
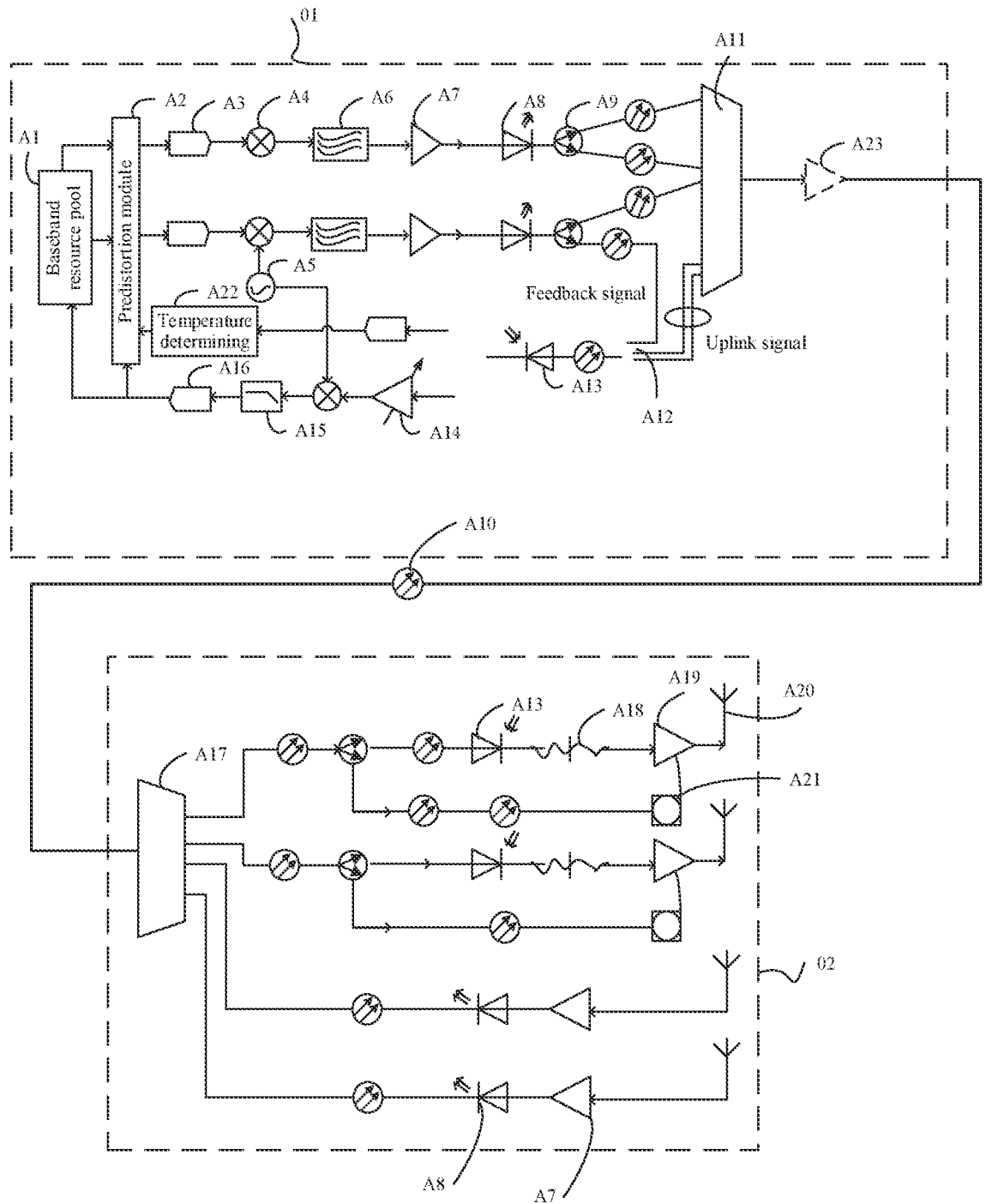
FIG. 11B is a schematic structural diagram of still another possible RoF system according to an embodiment of this application.

FIG. 11B is a schematic structural diagram of another possible RoF system according to an embodiment of this application.

The RoF system in this example includes at least one uplink, one downlink, and one local feedback link. Similarly, the optical splitter splits an output optical signal of the E/O module into two beams. One beam transmits downlink data, and the other beam is for local feedback. The optical splitter one-to-one corresponds to the E/O module. The BBU side sequentially sends optical signals of different wavelengths to a local PD using the optical switch in a time division multiplexing manner. The BBU side controls an electrical switch to select to receive a local feedback data signal or an uplink signal. The uplink signal herein may be an uplink data signal, or may be a Raman scattering optical wave for monitoring temperature. On the remote RRU side, the sensing optical fiber coils around the PA. Received optical information is split by the optical splitter into two beams. One beam is transmitted to a radio frequency link, and the other beam is transmitted to the sensing optical fiber. The BBU side remotely monitors the temperature of the PA using the ROTDR. Based on the local feedback signal and the obtained temperature information of the remote PA, parameters required by the cascaded DPD operation can be obtained using a polynomial method and parameter estimation methods such as a static/quasi-static model and a neural network.

Compared with the conventional technology, in this example, a multi-channel two-layer cascaded DPD architecture is also used, and modeling and compensation are separately performed for optical domain nonlinearity and electrical domain nonlinearity. The electrical domain nonlinear modeling and compensation is implemented by remotely monitoring the temperature of the PA on the BBU side, such that system hardware complexity can be reduced, and additional nonlinearity introduced by a design of detecting a complex feedback link from the RRU side to the BBU side in the conventional technology can be avoided. The optical domain nonlinear modeling and compensation is implemented by establishing a signal feedback link locally in the BBU, such that compensation may be uniformly performed for nonlinear distortion generated by a plurality of optical components (cases such as four-wave mixing and adjacent-wavelength crosstalk introduced by many optical components are considered). Different from the example 1, in this example, the feedback link is disposed before the wavelength division multiplexer, such that system hardware complexity may further be simplified.

Example 3

Figure 11C:
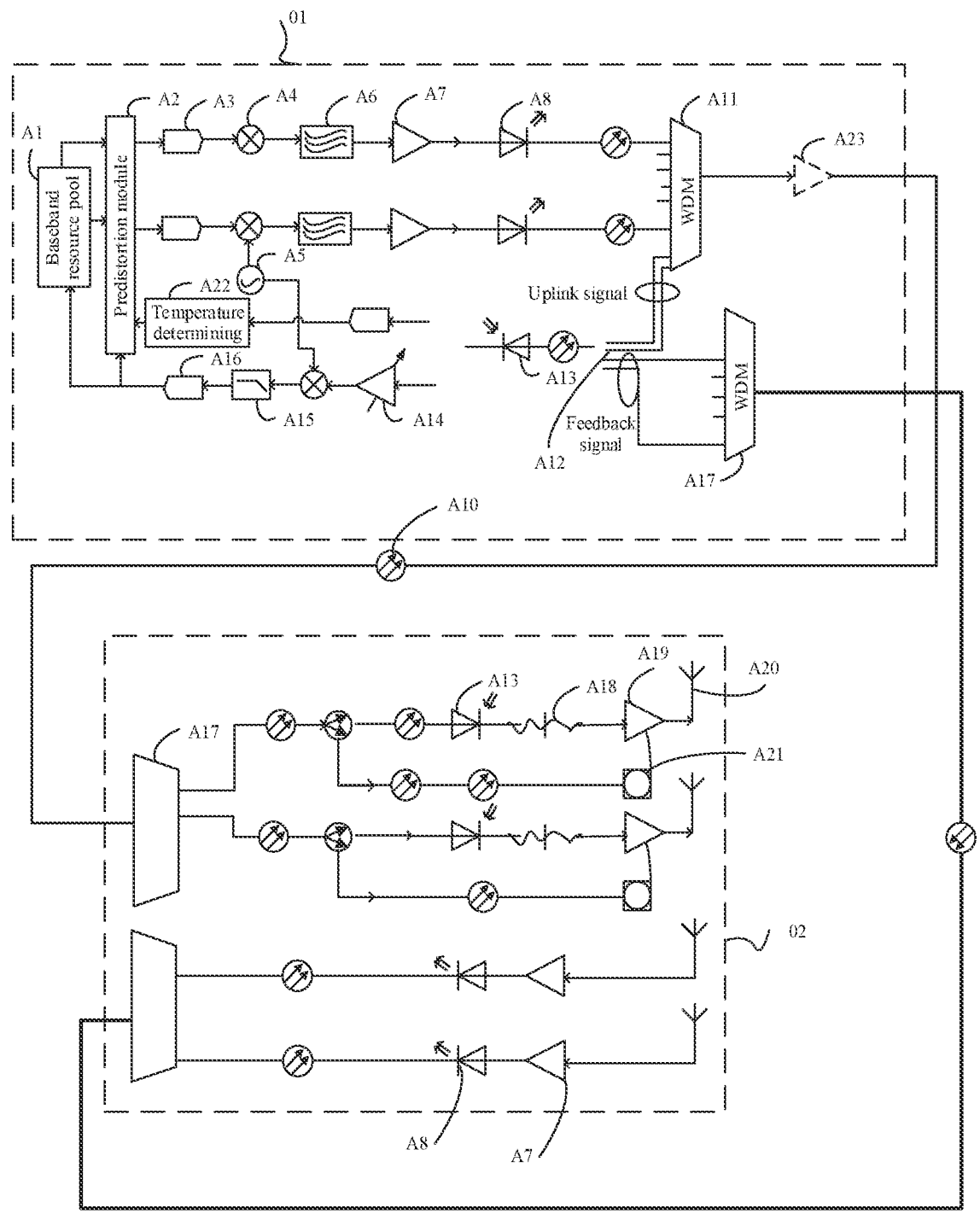
FIG. 11C is a schematic structural diagram of yet another possible RoF system according to an embodiment of this application.

FIG. 11C is a schematic structural diagram of another possible RoF system according to an embodiment of this application.

The RoF system in this example includes at least one uplink, one downlink, and one local feedback link. Similarly, the optical splitter splits an output optical signal of the E/O module into two beams. One beam transmits downlink data, and the other beam is for local feedback. The optical splitter one-to-one corresponds to the E/O module. The optical switch on the BBU side sequentially sends optical signals of different wavelengths to a local PD in a time division multiplexing manner. Uplink data is transmitted using an independent WDM-RoF link. A Raman scattering optical wave and a local feedback optical signal are connected to a same optical switch. The BBU controls the optical switch and an electrical switch to separately receive a feedback signal and a scattering signal. On the remote RRU side, the sensing optical fiber coils around the PA. Received downlink optical information is split by the optical splitter into two beams. One beam is transmitted to a radio frequency link and the other beam is transmitted to the sensing optical fiber. The BBU side remotely monitors the temperature of the PA using the ROTDR. Based on the local feedback signal and the obtained temperature information of the remote PA, parameters required by the cascaded DPD operation can be obtained using a polynomial method and parameter estimation methods such as a static/quasi-static model and a neural network.

Compared with the conventional technology, in this example, a multi-channel two-layer cascaded DPD architecture is also used, and modeling and compensation are separately performed for optical domain nonlinearity and electrical domain nonlinearity. The electrical domain nonlinear modeling and compensation is implemented by remotely monitoring the temperature of the PA on the BBU side, such that system hardware complexity can be reduced, and additional nonlinearity introduced by a design of detecting a complex feedback link from the RRU side to the BBU side in the conventional technology can be avoided. The optical domain nonlinear modeling and compensation is implemented by establishing a signal feedback link locally in the BBU, such that compensation may be uniformly performed for nonlinear distortion generated by a plurality of optical components (cases such as four-wave mixing and adjacent-wavelength crosstalk introduced by many optical components are considered). Different from the examples 1 and 2, temperature monitoring in this example is transmitted using a separate link, such that interference between uplink data transmission and temperature information transmission can be avoided, and accuracy of nonlinear compensation of the RoF system is further improved.

Example 4

Figure 11D:
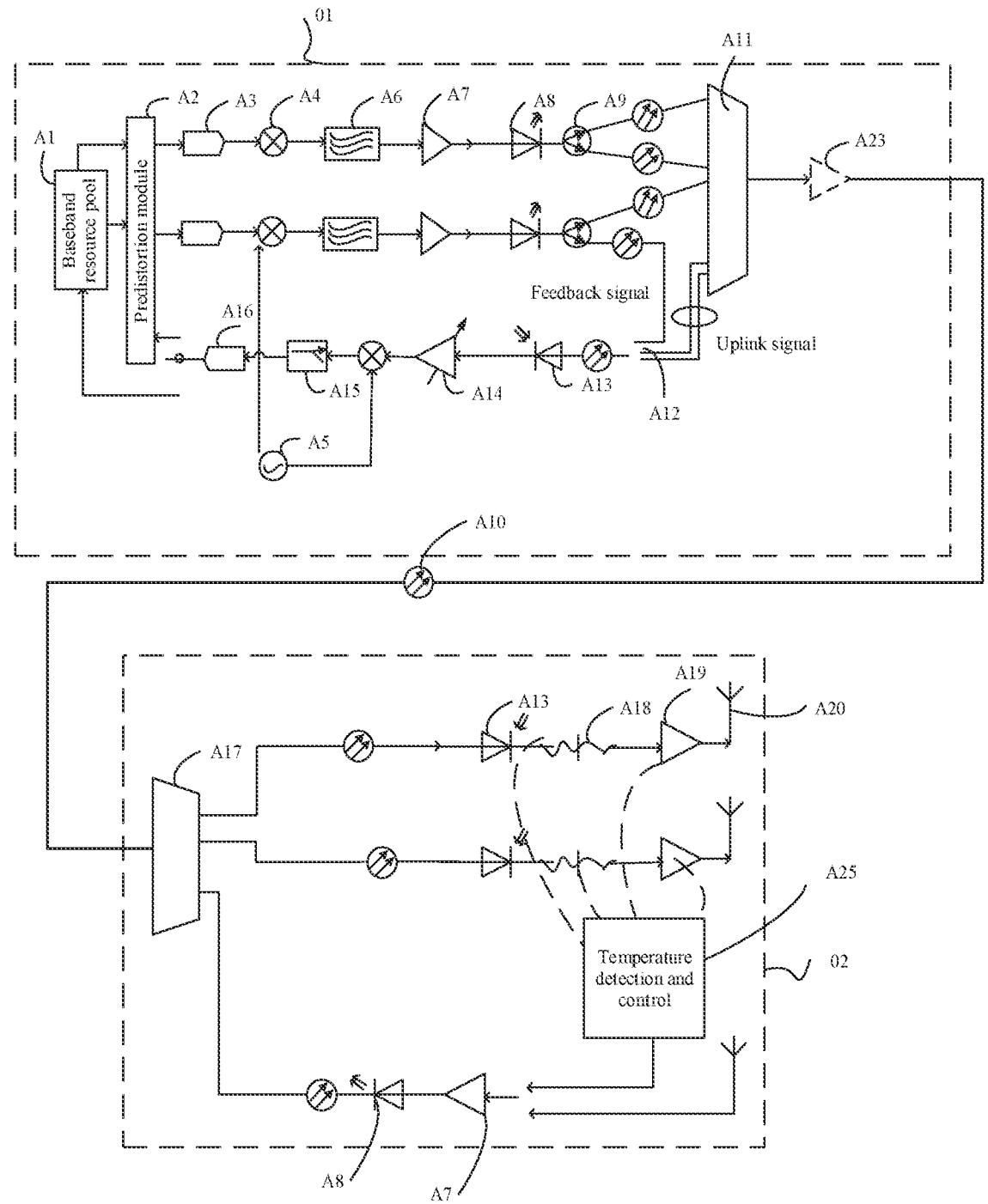
FIG. 11D is a schematic structural diagram of still yet another possible RoF system according to an embodiment of this application.

FIG. 11D is a schematic structural diagram of another possible RoF system according to an embodiment of this application.

In this example, the RoF system uses an electrical domain temperature monitoring method. A PA temperature monitoring and control circuit A25 monitors temperature of a PA and determine a temperature value backhaul solution. When the attenuator is a variable attenuator, this module can control an attenuation value of the attenuator.

The RoF system in this example includes at least one uplink, one downlink, and one local feedback link, and does not require a signal feedback link on the remote RRU side. The optical splitter on the BBU side splits an optical signal output by the E/O module into two beams. One beam transmits downlink data, and the other beam is for local feedback. Considering that there are a plurality of electro-optic modulators, the optical switch is required to sequentially send feedback signals of different wavelengths to a local PD in a time division multiplexing manner. On the remote RRU side, a thermistor cooperates with a lookup table to monitor the temperature of the PA. Based on a temperature change of the PA, a value of the attenuator can be automatically adjusted on the RRU side to ensure that transmit signal power is within a PA amplification linear range. Alternatively, the temperature information can be transmitted back to the BBU through the uplink using frequency-shift keying (FSK) modulation or other modulation modes. The information may share a transmission link with uplink information in a time division multiplexing manner, or may use an additional slot resource in an uplink data frame structure. Based on the local feedback signal and the obtained temperature information of the remote PA, parameters required by the cascaded predistortion operation can be obtained through training using a polynomial method and methods such as a static/quasi-static model and a neural network.

Compared with the conventional technology, in this example, a multi-channel two-layer cascaded DPD architecture is also used, and modeling and compensation are separately performed for optical domain nonlinearity and electrical domain nonlinearity. The electrical domain nonlinear modeling and compensation is implemented by remotely monitoring the temperature of the PA on the BBU side, such that system hardware complexity can be reduced, and additional nonlinearity introduced by a design of detecting a complex feedback link from the RRU side to the BBU side in the conventional technology can be avoided. The optical domain nonlinear modeling and compensation is implemented by establishing a signal feedback link locally in the BBU, such that compensation may be uniformly performed for nonlinear distortion generated by a plurality of optical components (cases such as four-wave mixing and adjacent-wavelength crosstalk introduced by many optical components are considered). Different from the examples 1, 2, and 3, in this example, the electrical domain temperature monitoring method is used, and the control circuit adjusts the value of the variable attenuator or a bias voltage value of the PA, such that linear amplification of a radio frequency signal can be implemented, and calculation requirements on the BBU side can further be reduced.

Example 5

Figure 11E:
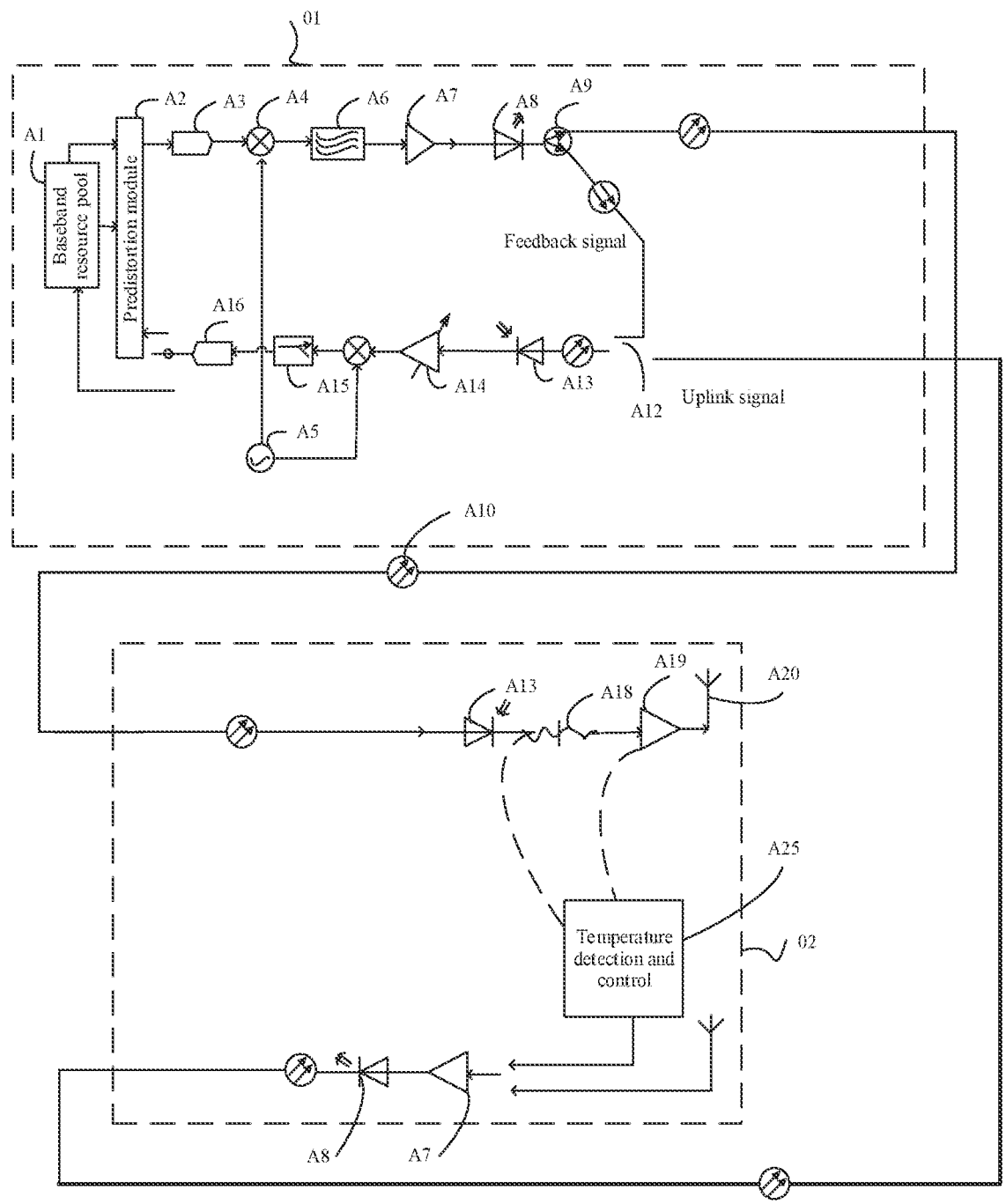
FIG. 11E is a schematic structural diagram of a further possible RoF system according to an embodiment of this application.

FIG. 11E is a schematic structural diagram of another possible RoF system according to an embodiment of this application.

In this example, the RoF system uses an electrical domain temperature monitoring method. The RoF system includes at least one uplink, one downlink, and one local feedback link, and does not require a signal feedback link on the remote RRU side. On the BBU side, the optical splitter splits an optical signal output by the E/O module and optionally passing through the optical domain amplifier into two beams. One beam transmits downlink data, and the other beam is for local feedback. On the remote RRU side, a thermistor cooperates with a lookup table to monitor the temperature of the PA. Based on a temperature change of the PA, a value of the attenuator can be automatically adjusted on the RRU side to ensure that transmit signal power is within a PA amplification linear range. Alternatively, the temperature information can be transmitted back to the BBU through the uplink using FSK modulation or other modulation modes. The information may share a transmission link with uplink information in a time division multiplexing manner, or may use an additional slot resource in an uplink data frame structure. Based on the local feedback signal and the obtained temperature information of the remote PA, parameters required by the cascaded predistortion operation can be obtained through training using a polynomial method and methods such as a static/quasi-static model and a neural network.

Compared with the conventional technology, in this example, a multi-channel two-layer cascaded DPD architecture is also used, and modeling and compensation are separately performed for optical domain nonlinearity and electrical domain nonlinearity. The electrical domain nonlinear modeling and compensation is implemented by remotely monitoring the temperature of the PA on the BBU side, such that system hardware complexity can be reduced, and additional nonlinearity introduced by a design of detecting a complex feedback link from the RRU side to the BBU side in the conventional technology can be avoided. The optical domain nonlinear modeling and compensation is implemented by establishing a signal feedback link locally in the BBU, such that compensation may be uniformly performed for nonlinear distortion generated by a plurality of optical components (cases such as four-wave mixing and adjacent-wavelength crosstalk introduced by many optical components are considered). Different from the examples 1, 2, 3, and 4, in this example, downlink data is transmitted using a single wavelength. Therefore, the WDM may not be disposed, such that nonlinearity caused by the WDM to the RoF system can be avoided, and calculation requirements on the BBU side can further be reduced.

Based on a same technical concept, an embodiment of this application further provides a computer-readable storage medium. The computer-readable storage medium stores a computer program. The computer program includes program instructions. When the program instructions are executed by a computer, the computer is enabled to perform the nonlinear compensation method provided in the foregoing embodiments.

Based on a same technical concept, an embodiment of this application further provides a computer-readable storage medium. The computer-readable storage medium stores a computer program. The computer program includes program instructions. When the program instructions are executed by a computer, the computer is enabled to perform the DPD lookup table generation method provided in the foregoing embodiments.

Based on a same technical concept, an embodiment of this application further provides a computer program product. The computer program product includes computer program code. When the computer program code is run on a computer, the computer is enabled to perform the nonlinear compensation method provided in the foregoing embodiments Based on a same technical concept, an embodiment of this application further provides a computer program product. The computer program product includes computer program code. When the computer program code is run on a computer, the computer is enabled to perform the DPD lookup table generation method provided in the foregoing embodiments.

Figure 12:
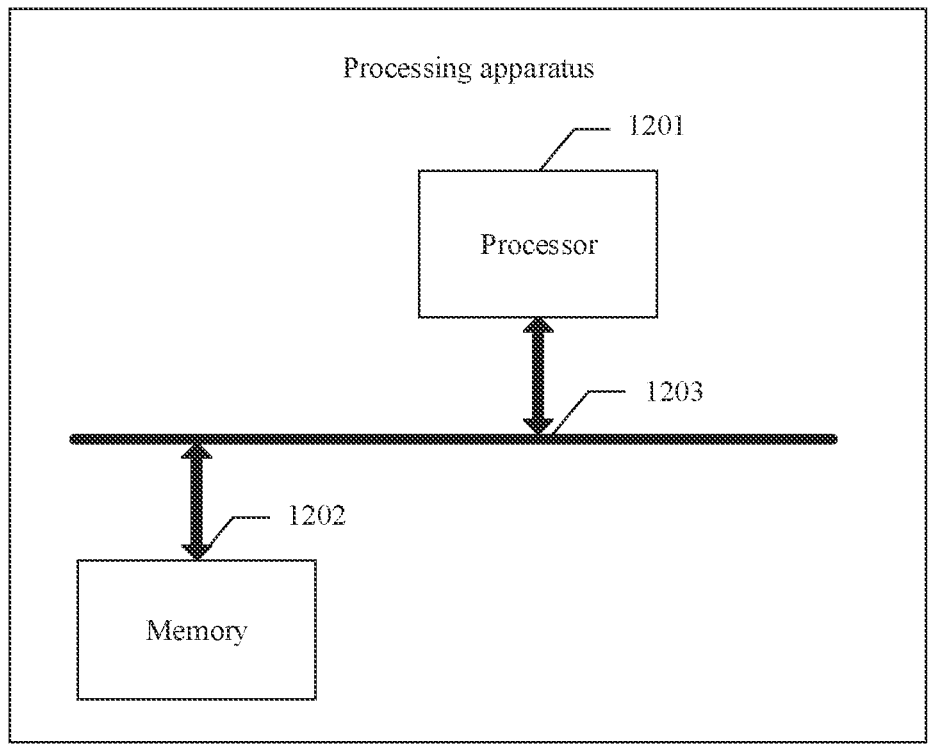
FIG. 12 is a schematic structural diagram of a processing apparatus according to an embodiment of this application.

Refer to FIG. 12. Based on a same technical concept, an embodiment of this application further provides a processing apparatus, including at least one processor 1201 and a memory 1202 communicatively connected to the at least one processor. The memory 1202 stores instructions that can be executed by the at least one processor 1201, and the at least one processor 1201 executes the instructions stored in the memory 1202, such that the nonlinear compensation method provided in the foregoing embodiments is performed.

The processor 1201 and the memory 1202 may be coupled using an interface circuit, or may be integrated together. This is not limited herein.

In this embodiment of this application, an example connection medium between the processor 1201 and the memory 1202 is not limited. In this embodiment of this application, the memory 1202 is connected to the processor 1201 through a bus 1203 in FIG. 12. The bus is indicated by a bold line in FIG. 12. A mode of connection between other components is schematically described, and is not limited thereto. The bus may be classified into an address bus, a data bus, a control bus, and the like. For ease of representation, only one bold line is used to represent the bus in FIG. 12, but this does not mean that there is only one bus or only one type of bus.

Figure 13:
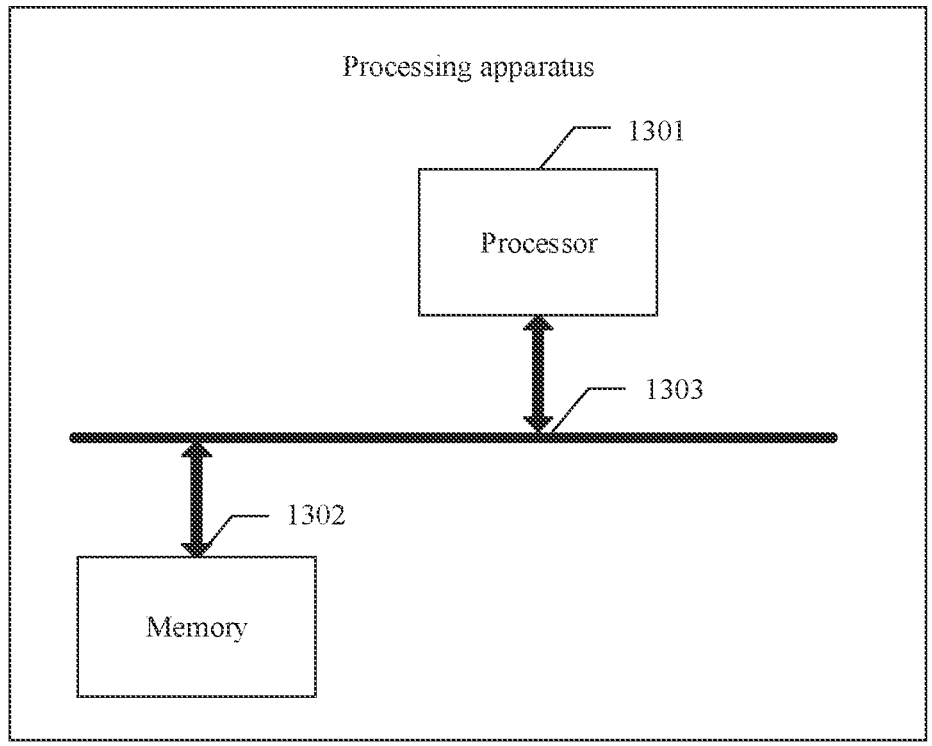
FIG. 13 is a schematic structural diagram of another processing apparatus according to an embodiment of this application.

Refer to FIG. 13. Based on a same technical concept, an embodiment of this application further provides a processing apparatus, including at least one processor 1301 and a memory 1302 communicatively connected to the at least one processor 1301. The processor 1301 and the memory 1302 may be coupled using an interface circuit, or may be integrated together. The memory 1302 stores instructions that can be executed by the at least one processor 1301, and the at least one processor 1301 executes the instructions stored in the memory 1302, such that the DPD lookup table generation method provided in the foregoing embodiments is performed.

The processor 1301 and the memory 1302 may be coupled using an interface circuit, or may be integrated together. This is not limited herein.

In this embodiment of this application, an example connection medium between the processor 1301 and the memory 1302 is not limited. In this embodiment of this application, the memory 1302 is connected to the processor 1301 through a bus 1303 in FIG. 13. The bus is indicated by a bold line in FIG. 13. A mode of connection between other components is schematically described, and is not limited thereto. The bus may be classified into an address bus, a data bus, a control bus, and the like. For ease of representation, only one bold line is used to represent the bus in FIG. 13, but this does not mean that there is only one bus or only one type of bus.

Based on a same technical concept, an embodiment of this application further provides a chip. The chip may be coupled to a memory, or the memory may be integrated into the chip. This is not limited herein.

The chip may read and execute program instructions stored in the memory, to perform the nonlinear compensation method provided in the foregoing embodiments.

Based on a same technical concept, an embodiment of this application further provides a chip. The chip may be coupled to a memory, or the memory may be integrated into the chip. This is not limited herein.

The chip may read and execute program instructions stored in the memory, to perform the DPD lookup table generation method provided in the foregoing embodiments.

It should be understood that the processor mentioned in the embodiments of this application may be implemented by hardware or may be implemented by software. When being implemented by the hardware, the processor may be a logic circuit, an integrated circuit, or the like. When being implemented by the software, the processor may be a general-purpose processor, and is implemented by reading software code stored in the memory.

For example, the processor may be a central processing unit (CPU), or may be another general-purpose processor, a DSP, an ASIC, an FPGA, another programmable logic device, a discrete gate, a transistor logic device, a discrete hardware component, or the like. The general-purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, for example, a static random-access memory (SRAM), a dynamic random-access memory (DRAM), a synchronous dynamic random access memory (SDRAM), a double data rate (DDR) synchronous dynamic random-access memory (DDR SDRAM), an enhanced synchronous dynamic random-access memory (ESDRAM), a SynchLink (SLD) dynamic random-access memory (SLDRAM), and a direct Rambus (DR) random-access memory (DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a compact disc ROM (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, such that the instructions executed by the computer or the processor of the other programmable data processing device generate an apparatus for implementing an example function in one or more procedures in the flowcharts and/or in one or more blocks in the block diagrams.

The computer program instructions may alternatively be stored in a computer-readable memory that can indicate a computer or another programmable data processing device to work in an example manner, such that the instructions stored in the computer-readable memory generate an artifact that includes an instruction apparatus. The instruction apparatus implements an example function in one or more procedures in the flowcharts and/or in one or more blocks in the block diagrams.

The computer program instructions may alternatively be loaded onto a computer or another programmable data processing device, such that a series of steps are performed on the computer or the other programmable device, such that computer-implemented processing is generated. Therefore, the instructions executed on the computer or the other programmable device provide steps for implementing an example function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A radio over fiber (RoF) system, comprising:
a baseband unit (BBU) including a downlink and a feedback link, wherein the feedback link comprises a feedback link input end;
a remote radio unit (RRU) configured to communicate with the BBU via at least one of the downlink or the feedback link, wherein the RRU comprises an electrical component;
an optical component disposed on the downlink, wherein the optical component includes an optical component output end coupled, directly or without components that impact nonlinear distortion from the optical component output end, to the feedback link input end;
a predistortion component disposed on the downlink and configured to:
receive, via the feedback link, a nonlinear signal by the optical component; and
perform digital predistortion (DPD) on a baseband signal based on the nonlinear signal and a temperature value of the electrical component, wherein performing the DPD comprises:
performing first modeling and compensation for optical domain nonlinearity based on the nonlinear signal by the optical component from the optical component output end without components that impact nonlinear distortion from the optical component output end; and
performing second modeling and compensation for electrical domain nonlinearity based on the temperature value of the electrical component and separately from the first modeling and compensation; and
a temperature detector configured to:
detect the temperature value; and
transmit the temperature value to the predistortion component.

2. The RoF system of claim 1, wherein the predistortion component is further configured to:
compensate for first nonlinear distortion associated with the electrical component by performing first DPD on an original baseband signal based on the temperature value; and
compensate for second nonlinear distortion associated with the optical component by performing, based on the nonlinear signal, second DPD on a first baseband signal that goes through the first DPD.

3. The RoF system of claim 2, wherein the predistortion component is further configured to:
store a correspondence between temperature of the electrical component and a DPD parameter; and
perform the first DPD on the original baseband signal based on the temperature value by:
setting, according to the correspondence, the DPD parameter corresponding to the temperature value; and
performing the first DPD on the original baseband signal based on the DPD parameter.

4. The RoF system of claim 2, wherein the predistortion component is further configured to perform, based on the nonlinear signal, the second DPD on the baseband signal that goes through the first DPD by:

calculating, using a preset algorithm, the baseband signal that goes through the first DPD and the nonlinear signal, to obtain a DPD parameter; and performing, using the DPD parameter, the second DPD on the baseband signal that goes through the first DPD, wherein the preset algorithm is any one of a neural network model, a Volterra polynomial, a memory polynomial (MP), a normalized memory polynomial, a Wiener-Hammerstein Wiener-Hammerstein polynomial, a cubic spline, or a canonical piecewise-linear (CPWL) equation.

5. The RoF system of claim 1, wherein the temperature detector is further configured to transmit an updated temperature value to the predistortion component when detecting that the temperature value of the electrical component is updated.

6. The RoF system of claim 1, wherein the temperature detector comprises a thermistor disposed on the RRU, and wherein the thermistor is closely attached to the electrical component.

7. The RoF system of claim 1, wherein the temperature detector comprises a sensing optical fiber and a Raman optical time domain reflectometer, wherein the sensing optical fiber is disposed on the RRU and is closely attached to the electrical component, wherein the Raman optical time domain reflectometer is disposed on the BBU and is connected to the predistortion component, wherein the sensing optical fiber is configured to sense the temperature value of the electrical component to generate a Raman scattering optical signal, and feed back the Raman scattering optical signal to the Raman optical time domain reflectometer, and wherein the Raman optical time domain reflectometer is configured to obtain the temperature value of the electrical component based on the Raman scattering optical signal.

8. The RoF system of claim 1, wherein the optical component comprises an electro-optic modulator, and wherein the electrical component comprises a power amplifier.

9. The RoF system of claim 8, wherein the optical component further comprises a wavelength-division multiplexer having a multiplexer input end connected to a modulator output end of the electro-optic modulator, and wherein the feedback link input end is connected:

to a multiplexer output end of the wavelength-division multiplexer; or between the wavelength-division multiplexer and the electro-optic modulator.

10. The RoF system of claim 1, further comprising at least one optical fiber disposed between the BBU and the RRU, and wherein the temperature value, an uplink signal, and a downlink signal of the RoF system are transmitted through the optical fiber.

11. The RoF system of claim 10, further comprising a first optical fiber and a second optical fiber disposed between the BBU and the RRU, and wherein:

the downlink signal and the temperature value are transmitted through the first optical fiber, and the uplink signal is transmitted through the second optical fiber;

the downlink signal is transmitted through the first optical fiber, and the uplink signal or the temperature value is transmitted through the second optical fiber; or the uplink signal and the downlink signal are transmitted through the first optical fiber, and the temperature value is transmitted through the second optical fiber.

12. The RoF system of claim 1, wherein the feedback link input end is:

directly connected to the optical component output end; or indirectly connected to the optical component output end using a linear element.

13. A nonlinear compensation method comprising:

outputting, by an optical component, a nonlinear signal;

feeding back, by a feedback link, the nonlinear signal to a predistortion component;

detecting, by a temperature detector, a temperature value of an electrical component;

transmitting, by the temperature detector, the temperature value to the predistortion component; and performing, by the predistortion component, digital predistortion (DPD) on a baseband signal based on the temperature value and the nonlinear signal, wherein performing the DPD comprises:

performing first modeling and compensation for optical domain nonlinearity based on the nonlinear signal by the optical component from an optical component output end without components that impact nonlinear distortion from the optical component output end; and performing second modeling and compensation for electrical domain nonlinearity based on the temperature value of the electrical component and separately from the first modeling and compensation.

14. The nonlinear compensation method of claim 13, wherein performing the DPD on the baseband signal based on the temperature value and the nonlinear signal comprises:

performing, by the predistortion component, first DPD on an original baseband signal based on the temperature value, wherein the first DPD is to compensate for nonlinear distortion caused by the electrical component; and performing, by the predistortion component based on the nonlinear signal, second DPD on a second baseband signal that goes through the first DPD, wherein the second DPD is to compensate for nonlinear distortion caused by the optical component.

15. The nonlinear compensation method of claim 14, wherein the predistortion component stores a correspondence between temperature of the electrical component and a DPD parameter, and wherein performing the first DPD on an original baseband signal based on the temperature value comprises:

setting, by the predistortion component according to the correspondence, the DPD parameter corresponding to the temperature value; and performing, by the predistortion component, the first DPD on the original baseband signal based on the DPD parameter.

16. The nonlinear compensation method of claim 14, wherein performing the second DPD on a baseband signal that goes through the first DPD comprises:

calculating, by the predistortion component using a preset algorithm, the baseband signal that goes through the first DPD and the nonlinear signal, to obtain a DPD parameter; and performing, by the predistortion component using the DPD parameter, the second DPD on the baseband signal that goes through the first DPD, wherein the preset algorithm is any one of a neural network model, a Volterra polynomial, a memory polynomial (MP), a normalized memory polynomial, a Wiener-Hammerstein Wiener-Hammerstein polynomial, a cubic spline, or a canonical piecewise-linear (CPWL) equation.

17. The nonlinear compensation method of claim 13, wherein detecting the temperature value of the electrical component and transmitting the temperature value to the predistortion component comprises transmitting, by the temperature detector when detecting that the temperature value of the electrical component is updated, an updated temperature value to the predistortion component.

18. The nonlinear compensation method of claim 13, wherein the temperature detector comprises a thermistor disposed on a remote radio unit (RRU), and wherein the thermistor is closely attached to the electrical component.

19. The nonlinear compensation method of claim 13, wherein the temperature detector comprises a sensing optical fiber and a Raman optical time domain reflectometer, wherein the sensing optical fiber is disposed on a remote radio unit (RRU) and is closely attached to the electrical component, wherein the Raman optical time domain reflectometer is disposed on a baseband unit (BBU) and is connected to the predistortion component, and wherein detecting the temperature value of the electrical component comprises:

sensing, by the sensing optical fiber, the temperature value of the electrical component to generate a Raman scattering optical signal;

feeding back the Raman scattering optical signal to the Raman optical time domain reflectometer; and obtaining, by the Raman optical time domain reflectometer, the temperature value of the electrical component based on the Raman scattering optical signal.

20. A processing apparatus in a radio over fiber (RoF) system, the processing apparatus comprising:

at least one processor; and a memory connected to the at least one processor and configured to store instructions that, when executed by the at least one processor, cause the processing apparatus to:

feed back, via a feedback link, a nonlinear signal to a predistortion component in the RoF system, wherein the nonlinear signal is output by an optical component in the RoF system;

detect, by a temperature detector, a temperature value of an electrical component in a remote radio unit (RRU);

transmit, by the temperature detector, the temperature value to a predistortion component; and perform digital predistortion (DPD) on a baseband signal based on the temperature value and the nonlinear signal, wherein performing the DPD comprises:

performing first modeling and compensation for optical domain nonlinearity based on the nonlinear signal by the optical component from an output end of the optical component without components that impact nonlinear distortion from the output end; and performing second modeling and compensation for electrical domain nonlinearity based on the temperature value of the electrical component and separately from the first modeling and compensation.

* * * * *